(12) United States Patent
Goto et al.

(10) Patent No.: US 7,574,873 B2
(45) Date of Patent: Aug. 18, 2009

(54) INVERTER DEVICE AND AIR CONDITIONER USING INVERTER DEVICE

(75) Inventors: Naomi Goto, Otsu (JP); Keizo Matsui, Kobe (JP); Makoto Yoshida, Kusatsu (JP)

(73) Assignee: Panasonic Corporation, Osaka (JP)

( * ) Notice: Subject to any disclaimer, the term of this patent is extended or adjusted under 35 U.S.C. 154(b) by 736 days.

(21) Appl. No.: 10/537,982

(22) PCT Filed: Dec. 9, 2003

(86) PCT No.: PCT/JP03/15709

§ 371 (c)(1),
(2), (4) Date: Nov. 8, 2005

(87) PCT Pub. No.: WO2004/054085

PCT Pub. Date: Jun. 24, 2004

(65) Prior Publication Data

US 2006/0150651 A1    Jul. 13, 2006

(30) Foreign Application Priority Data

Dec. 9, 2002 (JP) .............................. 2002-356409
Oct. 22, 2003 (JP) .............................. 2003-361709

(51) Int. Cl.
*H02P 27/04* (2006.01)
*H02M 1/12* (2006.01)
(52) U.S. Cl. .......................... 62/228.1; 318/803; 363/40
(58) Field of Classification Search ................ 62/228.1, 62/230, 259.2; 318/799, 800, 803, 801; 363/40, 363/41
See application file for complete search history.

(56) References Cited

U.S. PATENT DOCUMENTS

| 4,712,050 | A  | * | 12/1987 | Nagasawa et al. ...... 318/400.04 |
| 6,153,993 | A  | * | 11/2000 | Oomura et al. ............. 318/434 |
| 6,396,225 | B1 | * | 5/2002  | Wakui et al. ........... 318/400.01 |
| 6,523,361 | B2 | * | 2/2003  | Higashiyama ............. 62/228.4 |
| 6,564,576 | B2 | * | 5/2003  | Shibuya ....................... 62/505 |
| 2004/0095090 | A1 |  | 5/2004 | Nukushina |

FOREIGN PATENT DOCUMENTS

| JP | 2-9728 | 1/1990 |
| JP | 5-157287 | 6/1993 |
| JP | 2002-291284 | 10/2002 |

OTHER PUBLICATIONS

International Search Report corresponding to application No. PCT/JP03/15709 dated Mar. 30, 2004.

* cited by examiner

*Primary Examiner*—Marc E Norman
(74) *Attorney, Agent, or Firm*—RatnerPrestia

(57) ABSTRACT

A current sensor for detecting a power supply current is commonly used for detecting a current of a stator winding to detect a rotational position of a magnet rotor, so that a sinusoidal driving is realized without adding two current sensors for detection of a phase current, and also a phase shift circuit and a comparator needed in the conventional 120-degree current feeding are not required, and the number of components can be reduced. Therefore, an inverter device with a low noise and low vibration, having a small size, light weight and high reliability is obtained.

12 Claims, 23 Drawing Sheets

INVERTER DEVICE AND AIR CONDITIONER USING INVERTER DEVICE

THIS APPLICATION IS A U.S. NATIONAL PHASE APPLICATION OF PCT INTERNATIONAL APPLICATION PCT/JP2003/015709.

BACKGROUND OF THE INVENTION

1. Field of the Invention

The present invention relates to an inverter device for driving and controlling a sensorless DC brushless motor, and to an air conditioner applying such an inverter device to a motor-driven compressor using a sensorless DC brushless motor as a driving source.

2. Description of the Related Art

The following explains an example of an air conditioner for a vehicle, which mounts a conventional motor-driven compressor using a sensorless DC brushless motor as a driving source, and which includes a battery or other DC power source.

FIG. 20 shows a system configuration of an air conditioner for a vehicle. In the drawing, reference numeral 101 is an air duct, and air is sucked in through an air inlet port 103 by an action of an indoor fan 102, and after heat exchange by an indoor heat exchanger 104, the air is blown out into a vehicle compartment from an air blowout port 105.

A refrigeration cycle is constructed by the indoor heat exchanger 104 together with a motor-driven compressor 106 using a sensorless DC brushless motor as a driving source, a four-way changeover valve 107 for changing flow of a refrigerant to select cooling or heating, a throttle device 108, and an outdoor heat exchanger 110 for exchanging heat with fresh air by an action of an outdoor fan 109 (motor).

Reference numeral 111 is an inverter device for operating a sensorless DC brushless motor as a driving source of the motor-driven compressor 106, and the operation thereof together with the indoor fan 102, four-way changeover valve 107 and outdoor fan 109, is controlled by an air conditioner controller 112.

The air conditioner controller 112 is connected with an indoor fan switch 113 for turning on or off the indoor blast and controlling the fan power, an air conditioner switch 114 for selecting cooling or heating, or turning off, a temperature control switch 115, and a communication device 116 for communicating with a vehicle controller.

In this system, for example, when the blast is turned on and low power is set by the indoor fan switch 113 and cooling is instructed by the air conditioner switch 114, the air conditioner controller 112 sets the four-way changeover valve 107 as shown by a solid line in the diagram, and the indoor heat exchanger 104 is used as evaporator and the outdoor heat exchanger 110 as condenser, and the outdoor fan 109 is turned on and the indoor fan 102 is set to be a low power.

According to the temperature control switch 115, by varying a rotating speed of the motor-driven compressor 106 using the inverter device 111, the temperature of the indoor heat exchanger 104 is adjusted. When cooling or heating is turned off by the air conditioner switch 114, the motor-driven compressor 106 and outdoor fan 109 are turned off.

When the indoor fan switch 113 is turned off, the indoor fan 102 is turned off, and the motor-driven compressor 106 and outdoor fan 109 are also turned off in order to protect the refrigeration cycle.

On the other hand, when an OFF command of cooling or heating operation is received from a vehicle controller (not shown) via the communication device 116 because of a reason of saving a power or protecting a battery, the air conditioner controller 112 conducts an action similar to turning off the cooling or heating operation conducted by the air conditioner switch 114.

FIG. 21 shows a motor-driven compressor having a sensorless DC brushless motor as an example of the conventional motor-driven compressor 106.

In the diagram, a compression mechanism 28, a motor 31 and others are installed in a metal casing 32.

The refrigerant is sucked in through a suction port 33, and when the compression mechanism 28 (scroll mechanism, in this example) is driven by the motor 31, the refrigerant is compressed. The compressed refrigerant passes through the motor 31 in the metal casing 32 and then cools the motor 31, and is then discharged from a discharge port 34. A terminal 39 connected to a winding of the motor 31 inside is connected to the inverter device 111 in FIG. 20.

In an air conditioner for a vehicle mounting such a motor-driven compressor, it is important to drive at a low noise and low vibration from the viewpoint of riding comfort and effects of vibration on other devices. Especially in an electric car, since there is no engine, the operation is very silent (in a hybrid electric car while running by a motor without starting engine), and further while stopping, the motor-driven compressor can be driven by a battery power source, and in this case since there is no running noise or vibration, the noise and vibration of the motor-driven compressor will be more noticeable.

However, a current feeding system by the inverter device 111 adapted to the conventional motor-driven compressor 106 is an 120-degree power feeding system, and a magnetic field change is an interval of 60 degrees (a current feeding in an interval of 60 degrees). For example, see Patent Document 1: Japanese Patent Laid-open Publication No. H8-163891, page 8, FIG. 4.

Accordingly, torque fluctuations are significant in the motor 31 for driving the compression mechanism 28, and it was difficult to lower the noise and vibration.

FIG. 22 shows a circuit example of a construction having the inverter device 111 and coupled with the motor portion of the motor-driven compressor. In the diagram, reference numeral 121 is a battery, 122 is inverter operation switching elements connected to the battery 121, and 123 are inverter operation diodes. Reference numeral 124 shows stator windings of the motor, and 125 shows a magnet rotor of the motor. Reference numeral 126 is a current sensor which detects a power supply current, calculates the power consumption, and protects the switching elements. Reference numeral 127 is a phase shift circuit for detecting a position of the magnet rotor 125 from a voltage of the stator windings 124, and 128 is a comparator. Reference numeral 129 is a control circuit for controlling the switching elements 122 on the basis of signals from the current sensor 126, comparator 128 and others.

On the other hand, in the case of a sinusoidal driving, since a permanent magnet rotor is driven by a continuous rotating magnetic field, torque fluctuations are small. Therefore, it is desired to use a sinusoidal driving inverter device which produces sinusoidal current. For detection of a position of the permanent magnet rotor, two current sensors are used for detecting the current of the stator windings. For example, see Patent Document 2: Japanese Patent Laid-open Publication No. 2000-333465, page 9, FIG. 2.

FIG. 23 shows another circuit example using the inverter device 111. As compared with the construction in FIG. 22, the comparator 128 and phase shift circuit 127 are not provided, but there are further provided a current sensor 130 for detection of U-phase current and a current sensor 131 for detection of W-phase current in order to detect the position of the magnet rotor 125 from the current of the stator windings. The control circuit 129 calculates the current of the other phase from the current values of two phases from the two current sensors (two current sensors are needed, but any two phases of the phases U, V, W will do), detects the position of the magnet rotor 125, and controls the switching elements on the basis of the signals from the current sensor 126 and others.

The current sensor 130 for detection of U-phase current and current sensor 131 for detection of W-phase current are provided on the inverter output lines of which the potentials are always changing due to on/off application of a voltage of the battery 121, and therefore a photo coupler or the like is needed for signal transmission to the control circuit 129. As a result, the current sensors are complicated in structure, and a simple structure only by a shunt resistance can not be realized.

Aside from the low noise and low vibration, the air conditioner for a vehicle is also demanded to be small in size and light in weight from the viewpoint of accommodation and running performance.

DISCLOSURE OF THE INVENTION

As described above, by using the sinusoidal driving inverter which produces a sinusoidal current, there is an advantage that torque fluctuations are smaller, but in the conventional structure shown in FIG. 23, two current sensors are needed for detecting the position of the magnet rotor, which becomes a hamper factor in achieving a smaller size and lighter weight of an air conditioner for a vehicle.

Such a demand for a smaller size and lighter weight is not limited to a vehicle use, but is similarly applicable to such as a room air conditioner, and the smaller size and lighter weight are demanded in relation to a downsizing design of equipments.

The invention is devised to solve the problems of the prior art, and it is hence an object thereof to provide an inverter device of a low noise and low vibration, and small size and light weight.

The invention has another object to provide an air conditioner having a motor-driven compressor integrally mounting an inverter device of a low noise and low vibration, having a small size and light weight.

To solve the problems, in the invention, a current sensor for detecting a power supply current is commonly used for detection of a current of a stator winding so as to detect a rotational position of a magnet rotor.

That is, the inverter device according to a first aspect of the invention is an inverter device for driving a sensorless DC brushless motor, which comprises an inverter circuit for switching a direct-current voltage obtained from a direct-current power source and supplying an alternating-current current of a sinusoidal wave to the sensorless DC brushless motor; and current detecting means for detecting a power supply current between the direct-current power source and the inverter circuit. The sensorless DC brushless motor includes stator windings of a three-phase wiring electrically connected to the inverter circuit and a magnet rotor, and the current detecting means is a single current detecting means which is used for commonly detecting the current flowing in the stator windings, and by detecting the current flowing in the stator windings as well as detecting the power supply current, a rotational position of the magnet rotor is judged to thereby control the switching of the inverter circuit.

In the inverter device, preferably, the direct-current voltage of the direct-current power source may be switched by three-phase modulation.

Preferably, within a carrier period of the three-phase modulation, a current feeding time may be equally added or subtracted in a current feeding period in each phase of the stator windings.

In the inverter device, preferably, within a carrier period, a current feeding timing to each phase of the stator windings is shifted, so that the current flowing in the stator windings may be detected by the current detecting means.

The inverter device of the invention may be also adapted to be mounted on a vehicle.

Further, the inverter device of the invention may be also adapted for driving the sensorless DC brushless motor if the sensorless DC brushless motor is a driving source of the compressor.

According to the invention, a sinusoidal driving is possible without adding two current sensors for detection of a phase current, and a phase shift circuit and a comparator needed in the conventional 120-degree current feeding are not required, and hence the number of components is reduced, so that the inverter device achieving a low noise, low vibration, having a small size, light weight, and high reliability is obtained.

The noise and vibration can be further lowered by switching the direct-current voltage from the direct-current power source by the three-phase modulation.

Further, by shifting the current feeding timing to each phase of the stator windings of the sensorless DC brushless motor within a carrier period, the rotational position can be detected in each carrier, and the output to the stator windings can be adjusted, so that the inverter device achieving small torque fluctuations, low noise, and low vibration can be obtained.

An air conditioner according to a second aspect of the invention is characterized by mounting the inverter device of the first aspect.

The air conditioner may preferably comprise the inverter device integrally coupled to the compressor together with the sensorless DC brushless motor.

In the integral structure with the compressor, the air conditioner may preferably include a suction pipe, which is adapted to the compressor, for sucking a refrigerant for cooling the inverter device.

The inverter device may be disposed beneath the suction pipe or between the suction pipe and the compressor.

According to the second aspect of the invention, by integrally forming as one body with the compressor, the inverter device including the inverter circuit can be cooled, and the reliability of the inverter device is assured.

A shunt resistor can be used as a current sensor, and a sinusoidal driving is possible without adding two current sensors for detection of a phase current, and the phase shift circuit and comparator needed in the conventional 120-degree current feeding are not required, and hence the number of components is reduced, so that there is an effect that the inverter device achieving a low noise, low vibration, having a small size, light weight, and high reliability is obtained.

Since the compressor can be driven at a low noise and low vibration, and vibration resistance reliability is high with a small size and light weight, and hence, for example, the inverter device is appropriate for vehicle use.

By switching by three-phase modulation, the noise and vibration can be further lowered.

By the arrangement of shifting the current feeding in the carrier, a situation of detecting only one phase is eliminated (decreased), and the position detection may be further enhanced to be an effect.

In the three-phase modulation, all three phases of the stator windings can be detected, and a current calculation of the remaining phase after detection of two phases is not needed.

In the three-phase modulation according to the invention, the current feeding in the carrier is configured to be added or subtracted in all three phases, and a situation of detecting only one phase is eliminated, and the position detection may be further enhanced.

The invention thus has an effect of realizing the inverter device and motor-integrated type compressor having a small size and high reliability.

Because the inverter device has a small size, light weight, and high vibration resistance reliability, when applied in a vehicle air conditioner having a motor-driven compressor, the invention assures a high reliability of a control device including the inverter device against the vibrations peculiar to a vehicle.

BEST MODE FOR CARRYING OUT THE INVENTION

Preferred embodiments of the invention are described below with reference to the accompanying drawings. It should be noted, however, that the invention is not limited to the illustrated preferred embodiments alone.

EMBODIMENT 1

Figure 1:
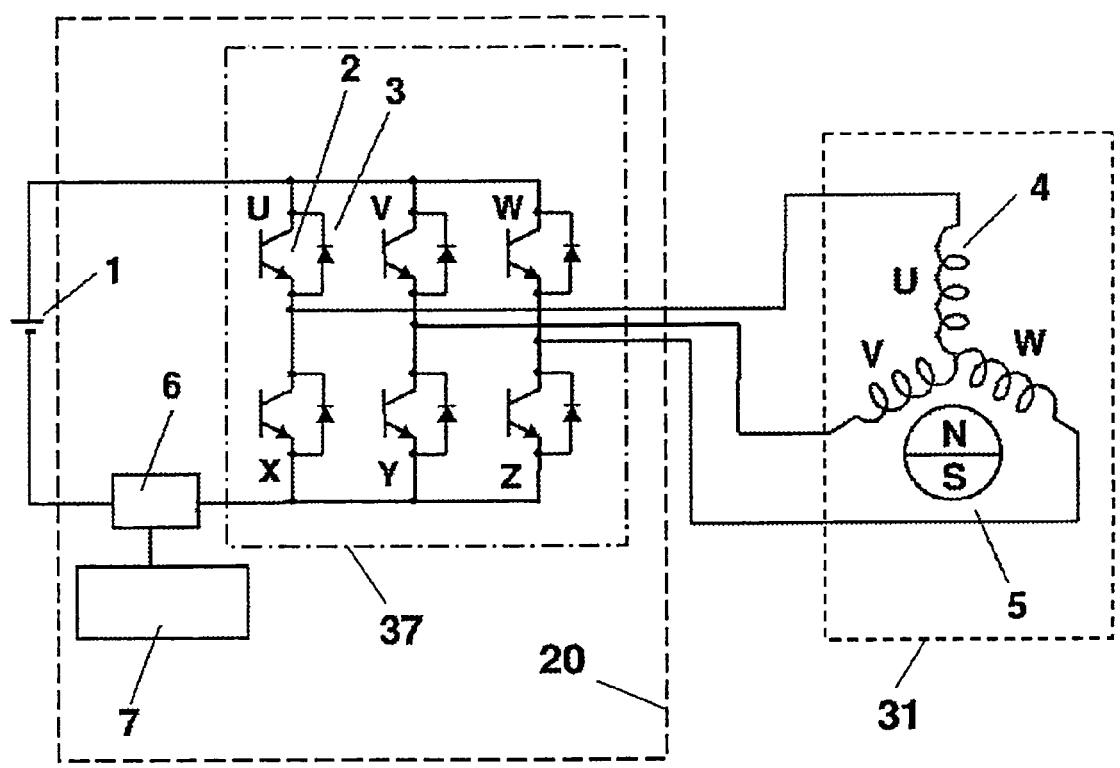
FIG. 1 is an electric circuit diagram having an inverter device according to a first embodiment of the invention.

FIG. 1 is an electric circuit diagram of the present embodiment. In the diagram, reference numeral 1 is a battery, 2 is a switching element for an inverter operation connected to the battery 1, and 3 is a diode for an inverter operation. Reference numeral 4 is a stator winding of a motor, and 5 is a magnet rotor of the motor. Reference numeral 7 is a control circuit for controlling switching elements on the basis of a signal from a current sensor 6 acting as current detecting means. Reference numeral 37 is an inverter circuit, 20 is an inverter device, and 31 is the motor.

Figure 22:
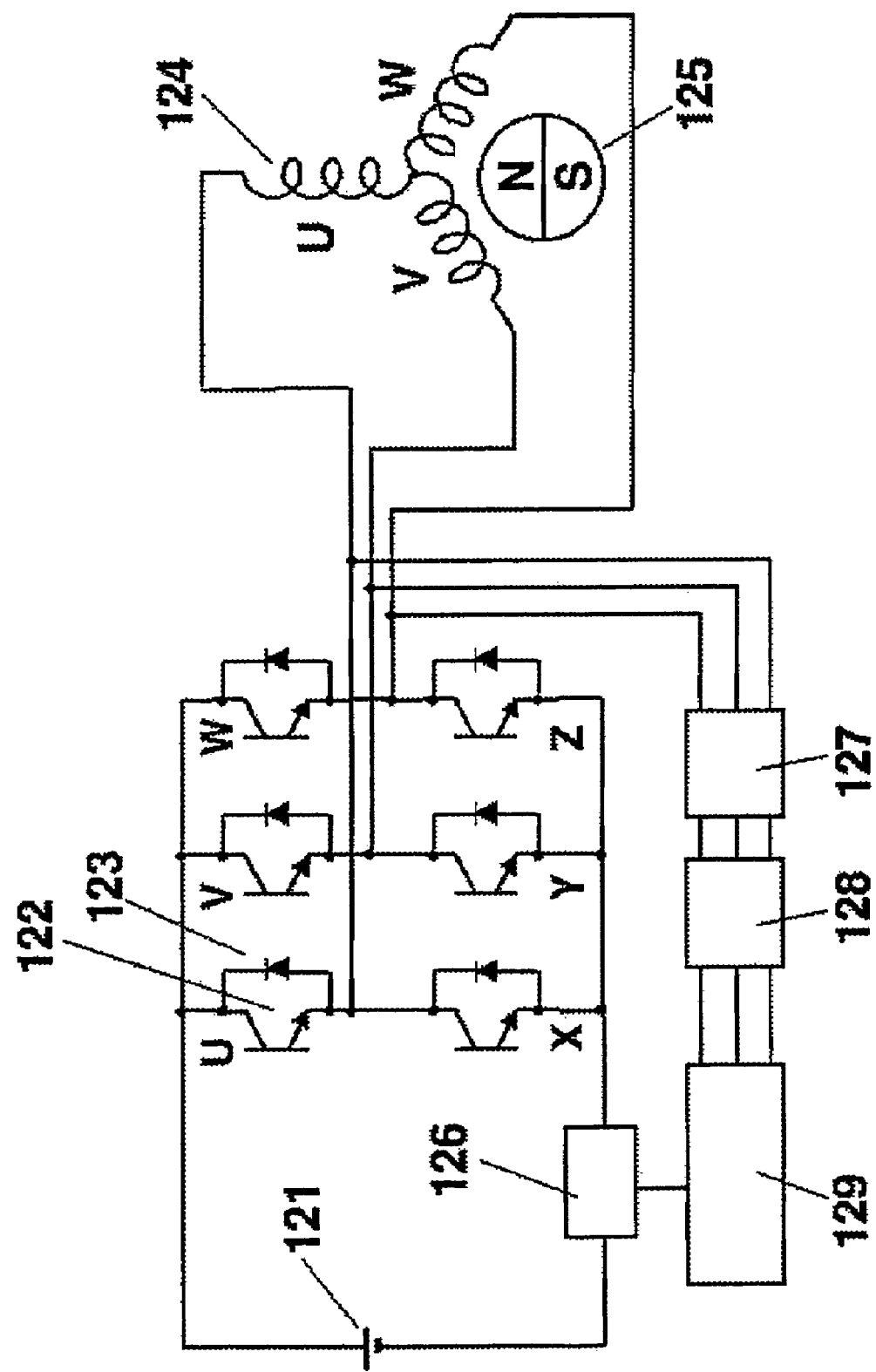
FIG. 22 is a circuit block diagram of a conventional inverter device coupled assembly for 120-degree current feeding driving.

Here, comparing the electric circuit diagram in FIG. 1 with the electric circuit diagram for 120-degree current feeding driving in FIG. 22, it is not necessary to provide a comparator 128 and a phase shift circuit 127 in the embodiment 1.

Figure 23:
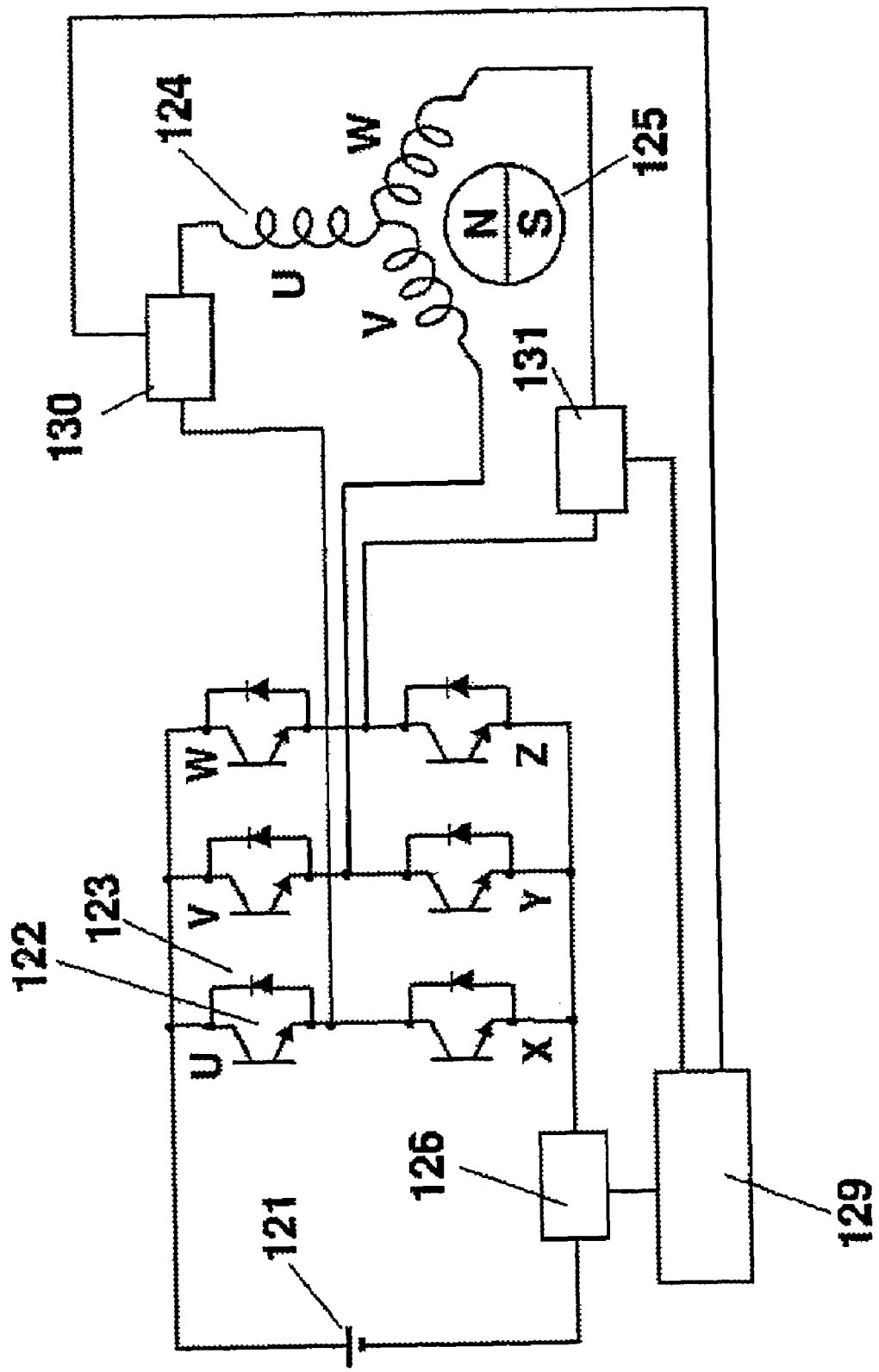
FIG. 23 is a circuit block diagram of an inverter device coupled assembly for sinusoidal driving having a conventional current sensor for the same phase current detection.

Further, comparing the electric circuit diagram in FIG. 1 with the electric circuit diagram for sinusoidal driving having current sensors for phase current detection in FIG. 23, it is not necessary to provide a current sensor 130 for detection of U-phase current and a current sensor 131 for detection of W-phase current in the embodiment 1.

A detected current value of the current sensor 6 is sent to the control circuit 7, and is used for calculating a power consumption and for protecting the switching elements 2, and is further used for detecting a position of the magnet rotor 5.

Hence, the control circuit 7 in the embodiment 1 does not require signal input circuits (hardware) for the comparator 128 and phase shift circuit 127 in FIG. 22 and for the current sensor 130 for detection of U-phase current and the current sensor 131 for detection of W-phase current in FIG. 23, and it is enough to change a program software only.

Also, on the basis of a rotating speed command signal (not shown) and the like, the switching elements 2 is controlled. As the current sensor 6, a sensor using a Hall element or a shunt resistor can be used, and any will do so long as a peak value of the switching current from the switching elements 2 can be detected.

Especially when using a shunt resistor, as compared with a sensor using a Hall element, only the resistor is used, and there is no Hall element that requires attention to a vibration or the like, and hence a high reliability can be obtained. In contrast thereto, since the conventional current sensor 130 for detection of U-phase current and current sensor 131 for detection of W-phase current in FIG. 23 are connected to output portions of U phase or W phase where the potentials fluctuate, the reliability could not be enhanced by using a shunt resistor.

Moreover, since the current sensor 6 is designed to detect the peak of the switching current in order to protect the switching elements 2, it can be used as it is.

In FIG. 1, the current sensor 6 is inserted to a minus side of a power source line, but since the current is the same, it may be provided also at the plus side. By this arrangement, the number of components is decreased as compared with the prior art, and the size and weight can be reduced, and the reliability such as a vibration resistance may be improved at the same time. In particular, the vibration resistance is important since the current sensor and the like is mounted on a printed circuit board, and in the configuration of the present embodiment, the vibration resistance is enhanced.

Figure 2:
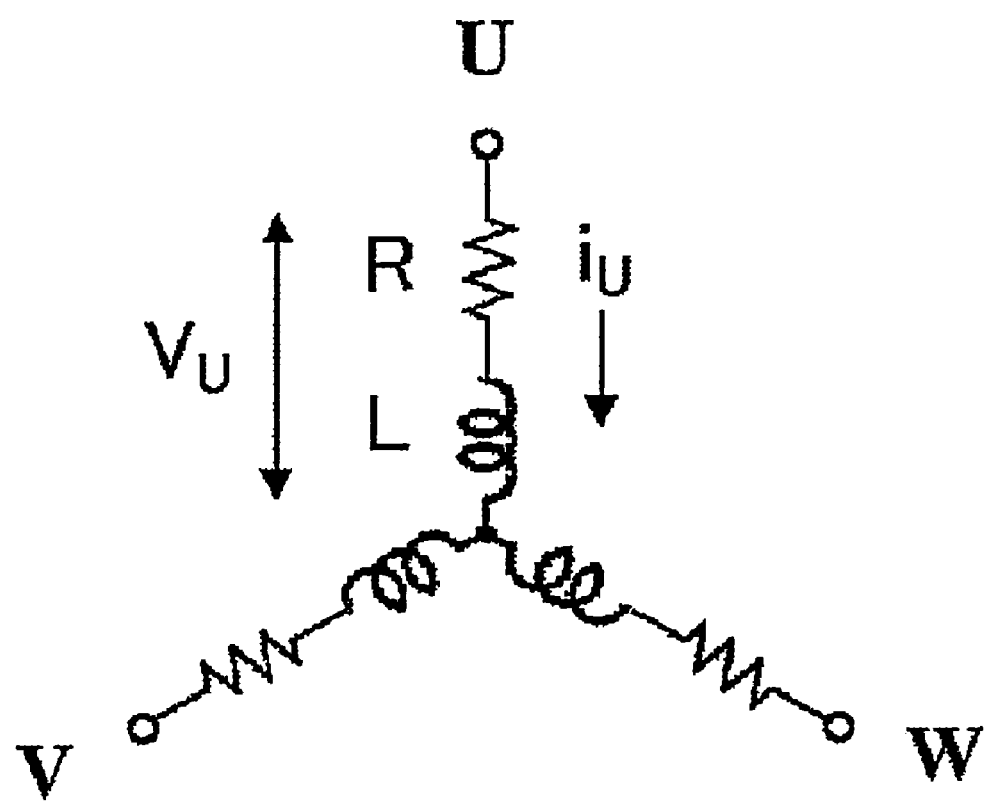
FIG. 2 is an explanatory diagram of a detecting method of an induced voltage in case of a sinusoidal driving in the above electric circuit.

Referring now to FIG. 2, a method of detecting a position of the magnet rotor 5 is explained below.

FIG. 2 shows a relation between a phase current and an induced voltage in U phase. The induced voltage is a voltage induced in the stator winding 4 due to the rotation of the magnet rotor 5 shown in FIG. 1, and hence it can be used for detecting the position of the magnet rotor 5.

Figure 3:
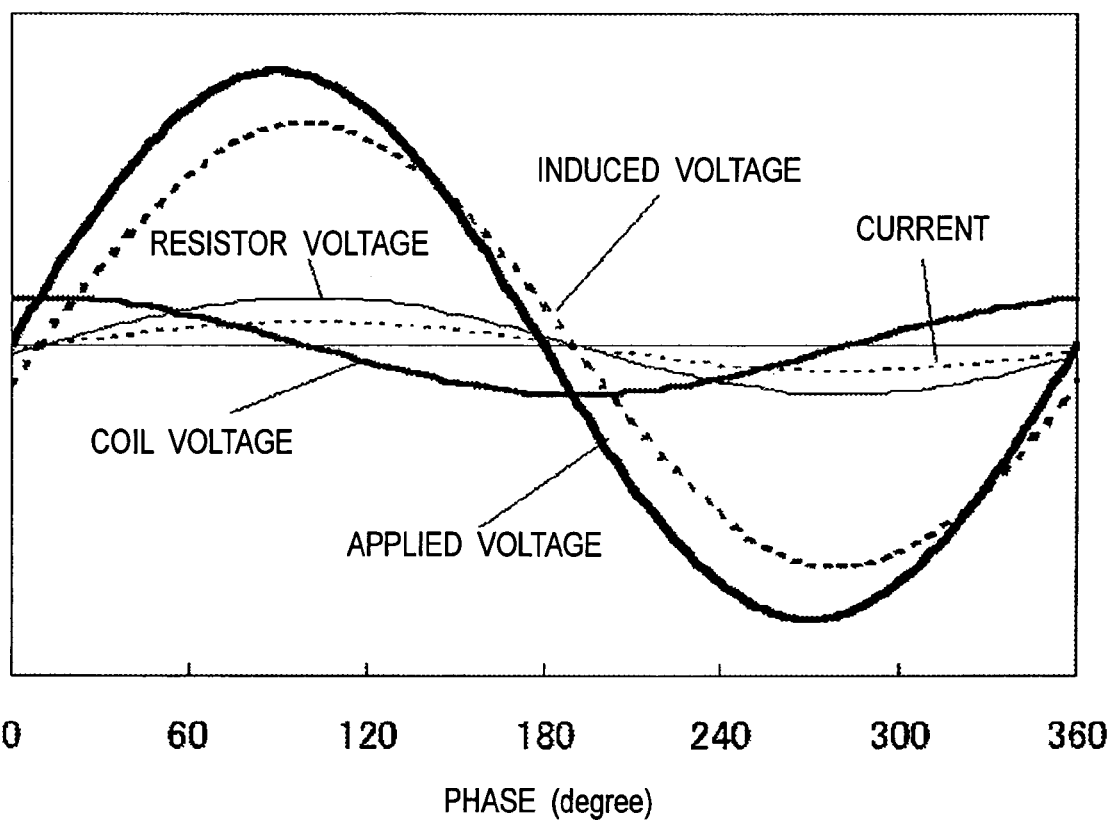
FIG. 3 is a waveform diagram showing a voltage and current of a sensorless DC brushless motor in the above inverter device.

The stator winding 4 in FIG. 1 includes a resistance R as well as an inductance L. The sum of the induced voltage, voltage of inductance L and voltage of resistance R is equal to the applied voltage from the inverter device 20. Supposing that the induced voltage is EU, phase current is iU, and applied voltage is VU, the applied voltage VU is expressed as: $VU=EU+R \cdot iU+L \cdot diU/dt$. FIG. 3 shows an example of one phase of the voltage and current of the sensorless DC brushless motor. Accordingly, the induced voltage EU is expressed as: $EU=VU-R \cdot iU-L \cdot diU/dt$.

The control circuit 7 shown in FIG. 1 controls the switching element 2, and hence the applied voltage VU is known. Accordingly, by entering the values of the inductance L and resistance R in the program software of the control circuit 7, the induced voltage EU can be calculated by detecting the phase current iU.

Next, the method of detecting the position of the magnet rotor 5 by the current sensor 6 is explained.

Figure 4:
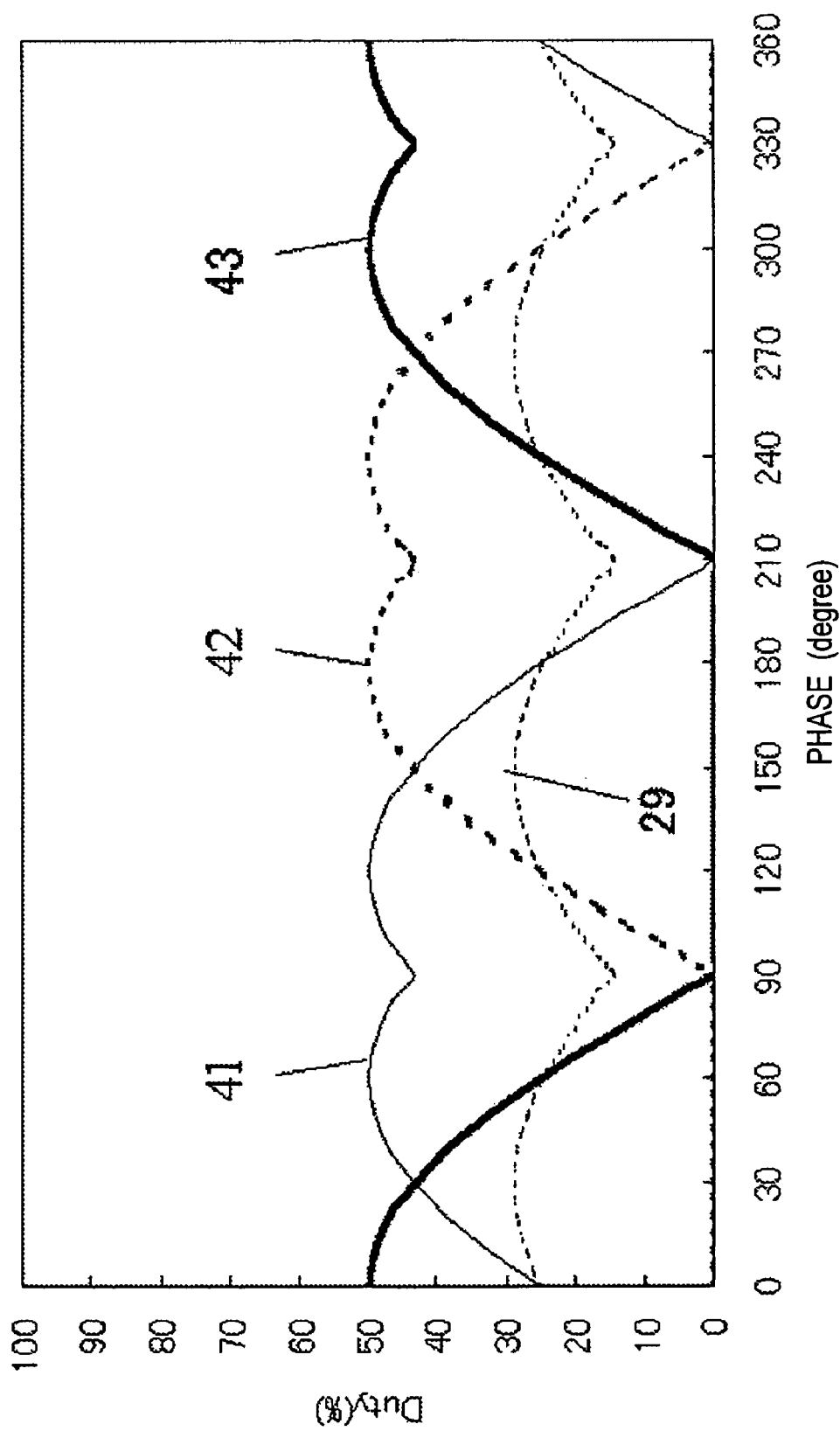
FIG. 4 is a waveform diagram showing a modulation degree of each phase at a maximum modulation degree 50% of two-phase modulation in the above inverter device.
Figure 5:
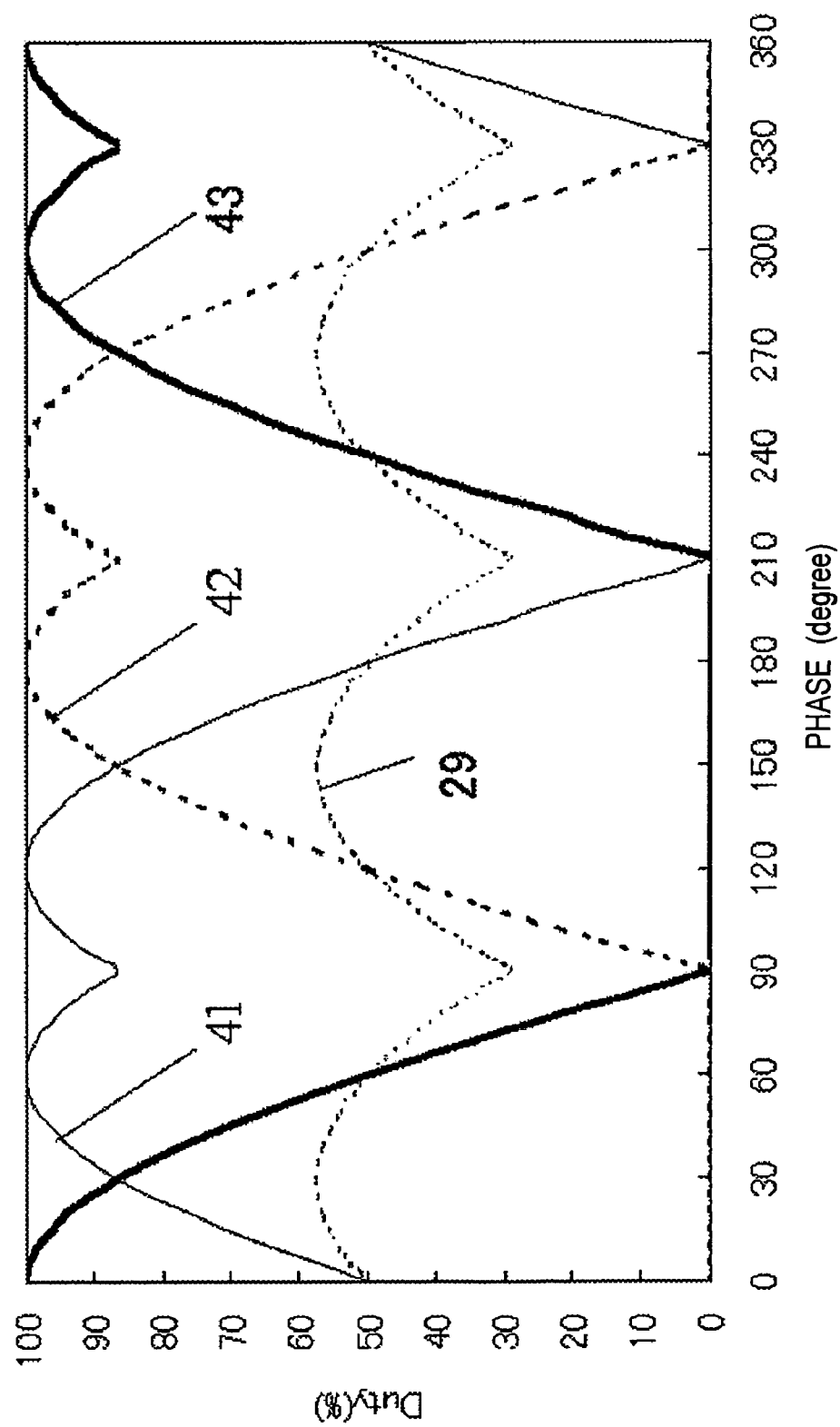
FIG. 5 is a waveform diagram showing a modulation degree of each phase at a maximum modulation degree 100% of two-phase modulation in the above inverter device.
Figure 6:
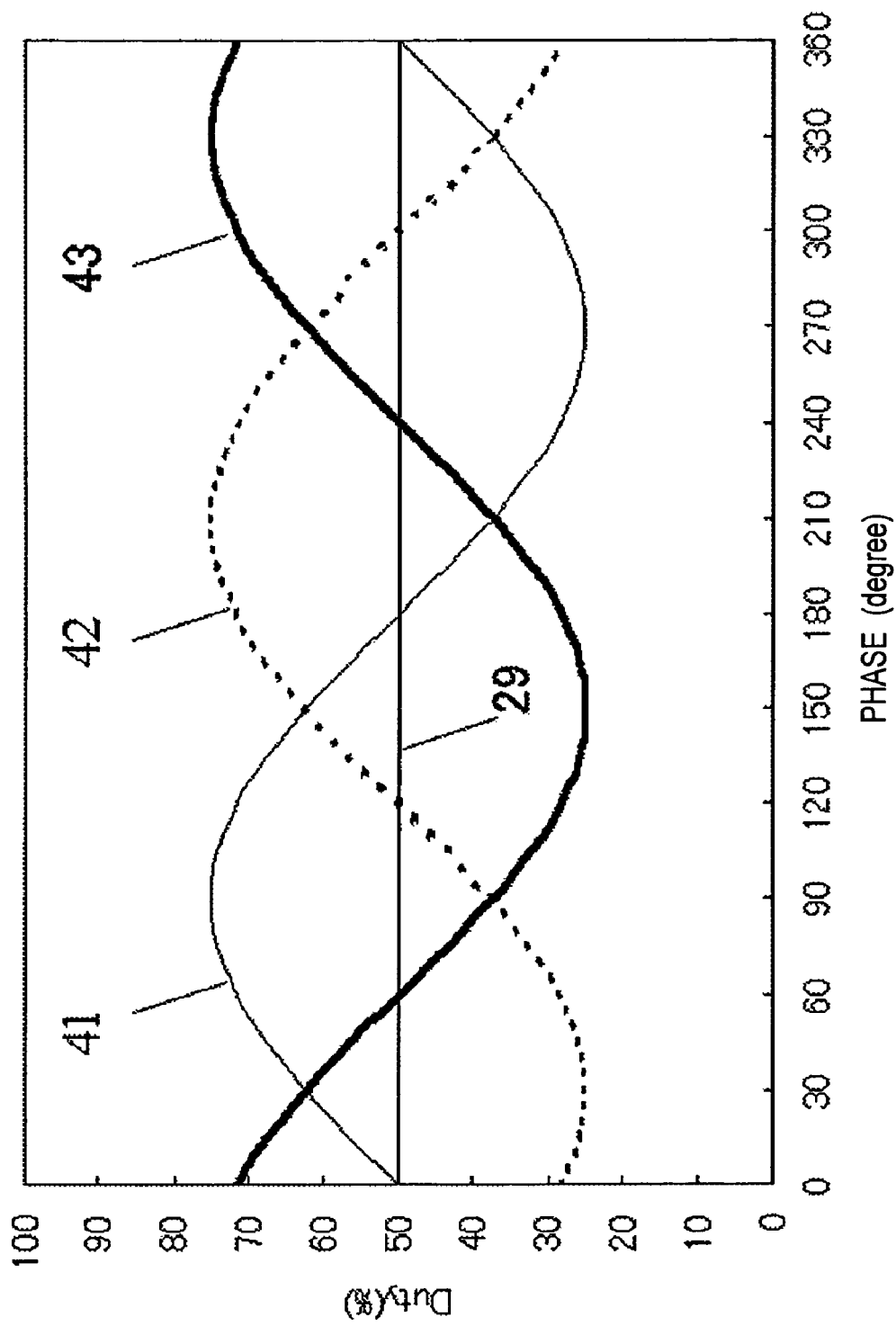
FIG. 6 is a waveform diagram showing a modulation degree of each phase at a maximum modulation degree 50% of three-phase modulation in the above inverter device.
Figure 7:
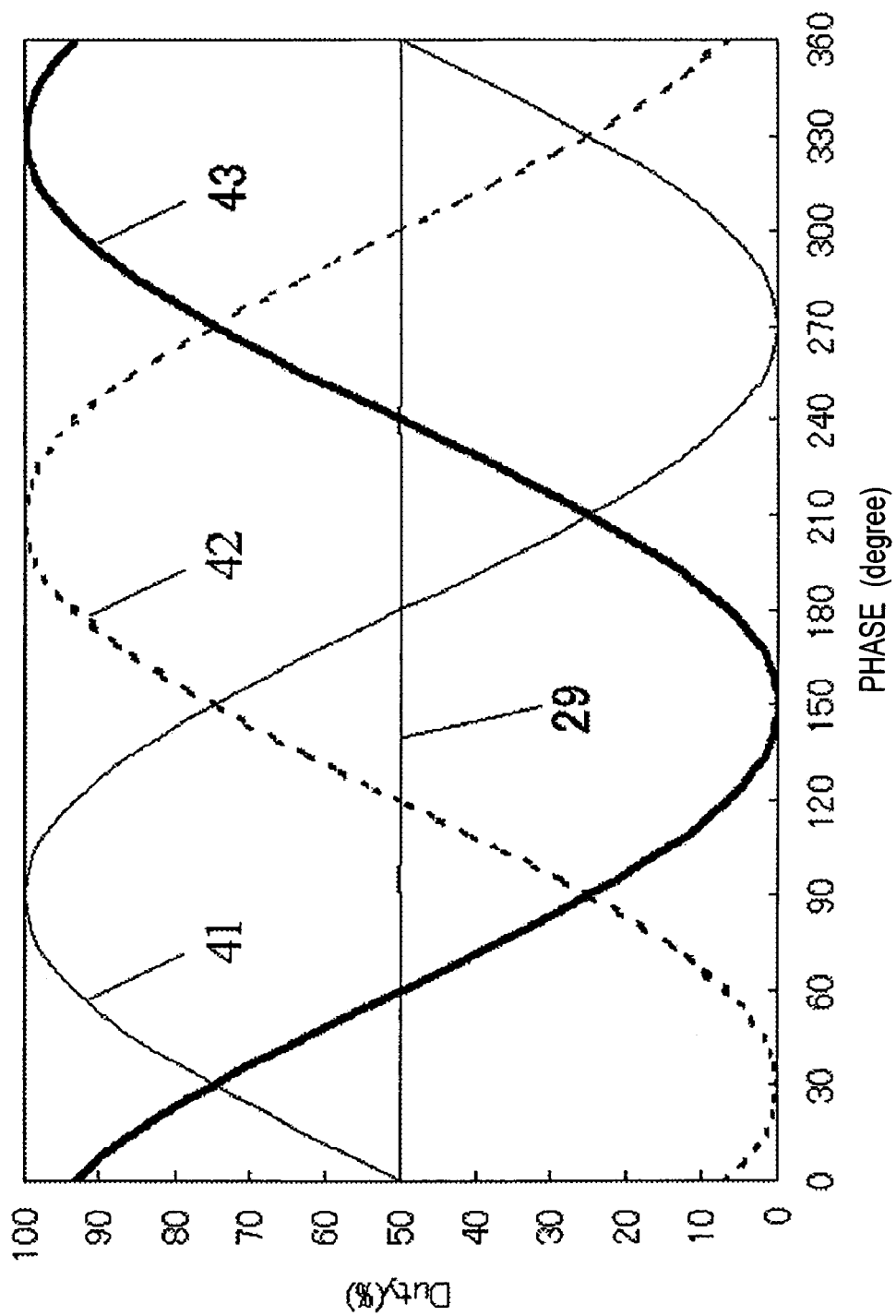
FIG. 7 is a waveform diagram showing a modulation degree of each phase at a maximum modulation degree 100% of three-phase modulation in the above inverter device.

First, waveforms of two-phase modulation and three-phase modulation are explained. FIG. 4 shows a two-phase modulation at a maximum modulation degree 50%, FIG. 5 shows a two-phase modulation at a maximum modulation degree 100%, FIG. 6 shows a three-phase modulation at a maximum modulation degree 50%, and FIG. 7 shows a three-phase modulation at a maximum modulation degree 100%.

In the diagrams, reference numeral 41 is a U-phase terminal voltage, 42 is a V-phase terminal voltage, 43 is a W-phase terminal voltage, and 29 is a neutral point voltage. In the two-phase modulation, the graph extends in one direction from 0% to 100% along with increment of the modulation degree, while in the three-phase modulation, the graph extends in two direction from 50% toward 0% and 100% along with increment of the modulation degree.

Figure 8:
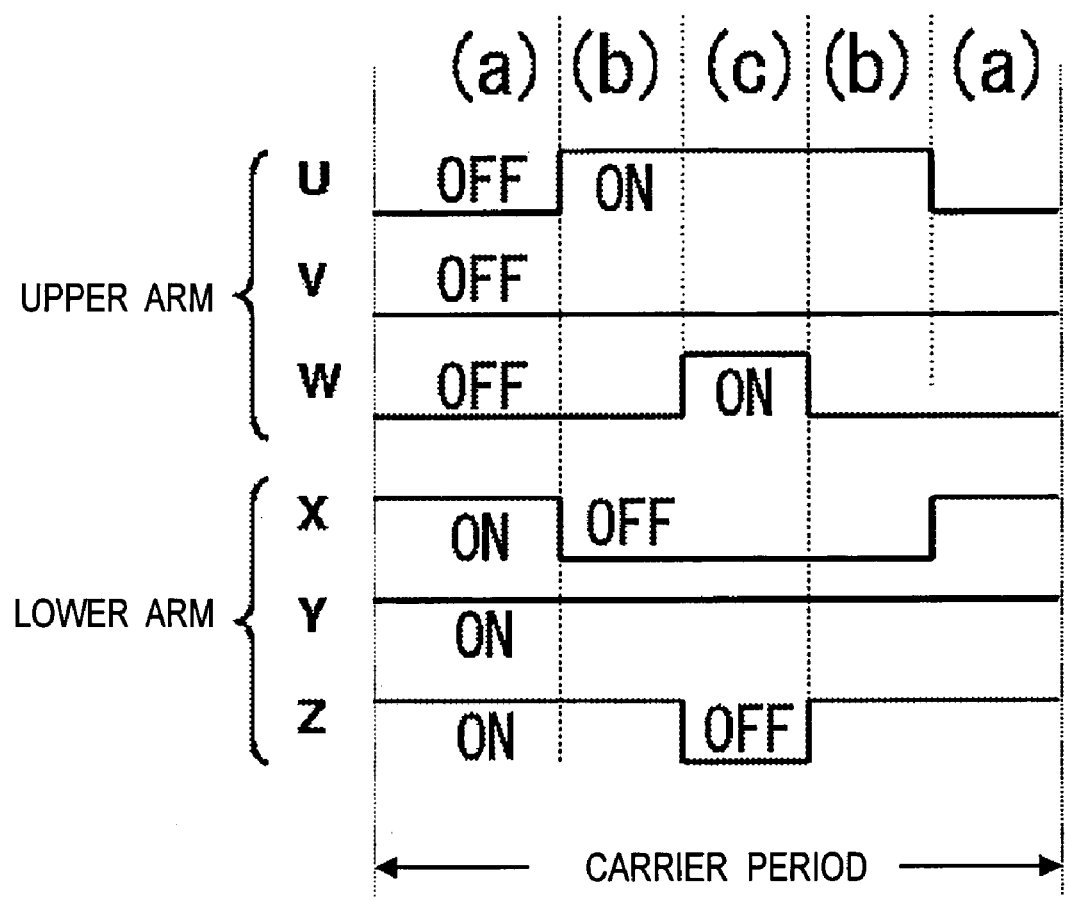
FIG. 8 is a current feeding timing chart showing a phase current detecting method according to the first embodiment of the invention.

The operation is described below referring to a circuit diagram. FIG. 8 shows an example of a current feeding of the upper arm switching elements U, V, W and lower arm switching elements X, Y, Z within one carrier (carrier period). In this case, in the two-phase modulation at the maximum modulation degree 100% in FIG. 5, the phase of current feeding is about 80 degrees. There are three current feeding patterns (a), (b) and (c).

Figure 9:
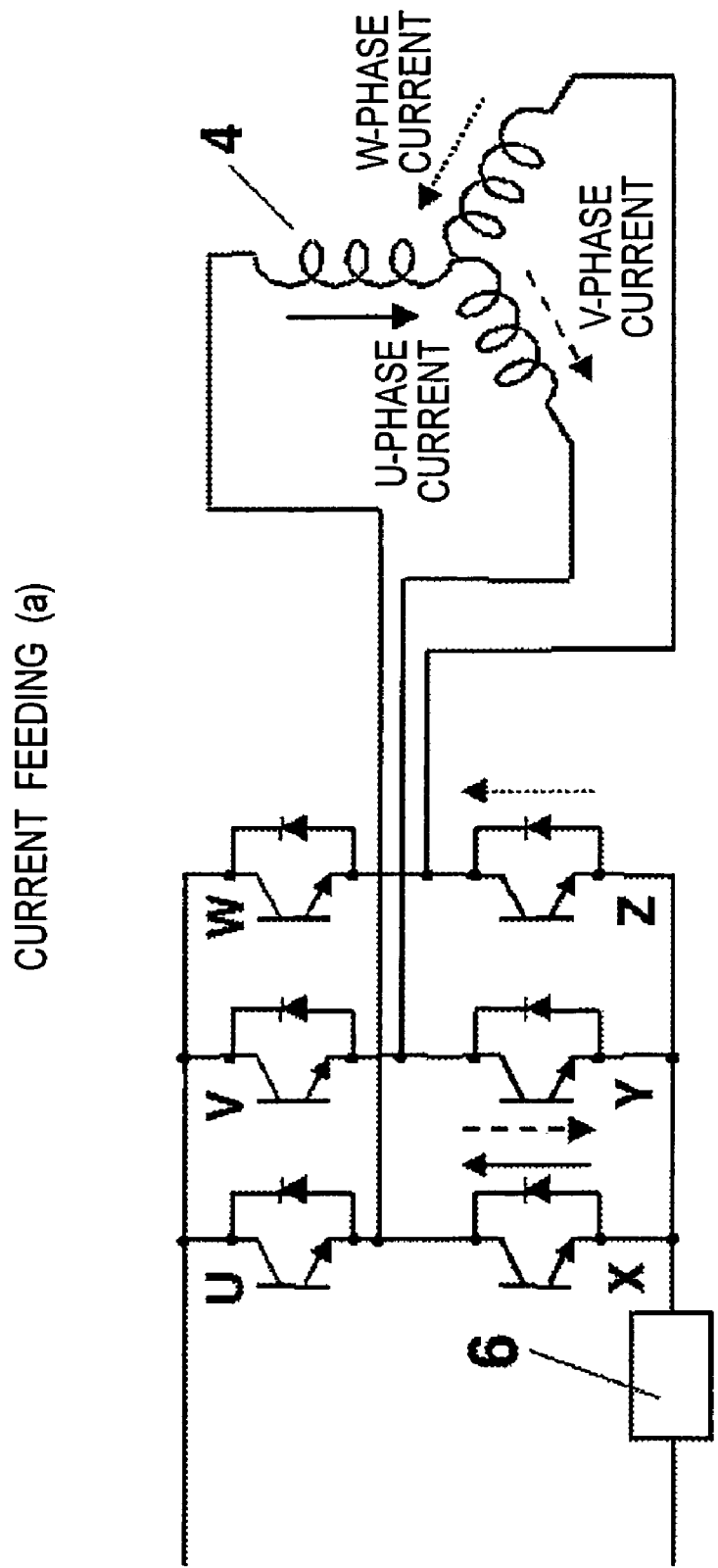
FIG. 9 is an electric circuit diagram showing a current route at a current feeding timing (a) of the above phase current detection.

In the current feeding pattern (a), all of the upper arm switching elements U, V, W are turned off, and all of the lower arm switching elements X, Y, Z are turned on. FIG. 9 shows the current flow at this time.

As clear from the diagram, the U-phase current and W-phase current flow from the diodes parallel to the lower arm switching elements X, Z to the stator windings 4, and the V-phase current flows from the stator winding 4 to the lower arm switching element Y. Hence, the current does not flow in the current sensor 6 and is not detected.

Figure 10:
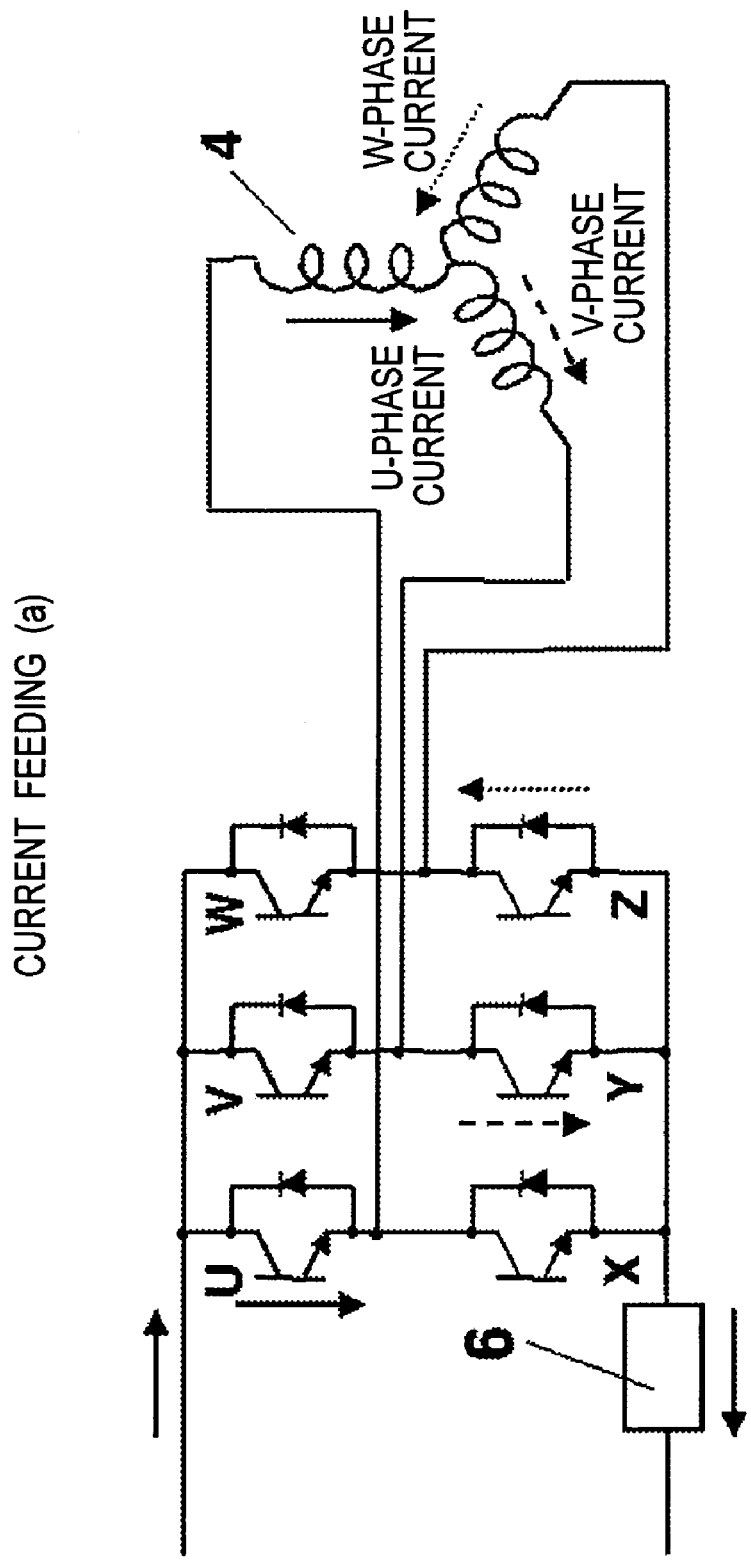
FIG. 10 is an electric circuit diagram showing a current route at a current feeding timing (b) of the above phase current detection.

In the current feeding pattern (b), the upper arm switching element U is turned on and lower arm switching elements Y, Z are turned on. The current flow at this time is shown in FIG. 10.

As clear from the diagram, the U-phase current flows from the upper arm switching element U to the stator winding 4, the W-phase current flows from the diode parallel to the lower arm switching element Z to the stator winding 4, and the V-phase current flows from the stator winding 4 to the lower arm switching element Y. Hence, the U-phase current flows in the current sensor 6 and is detected.

Figure 11:
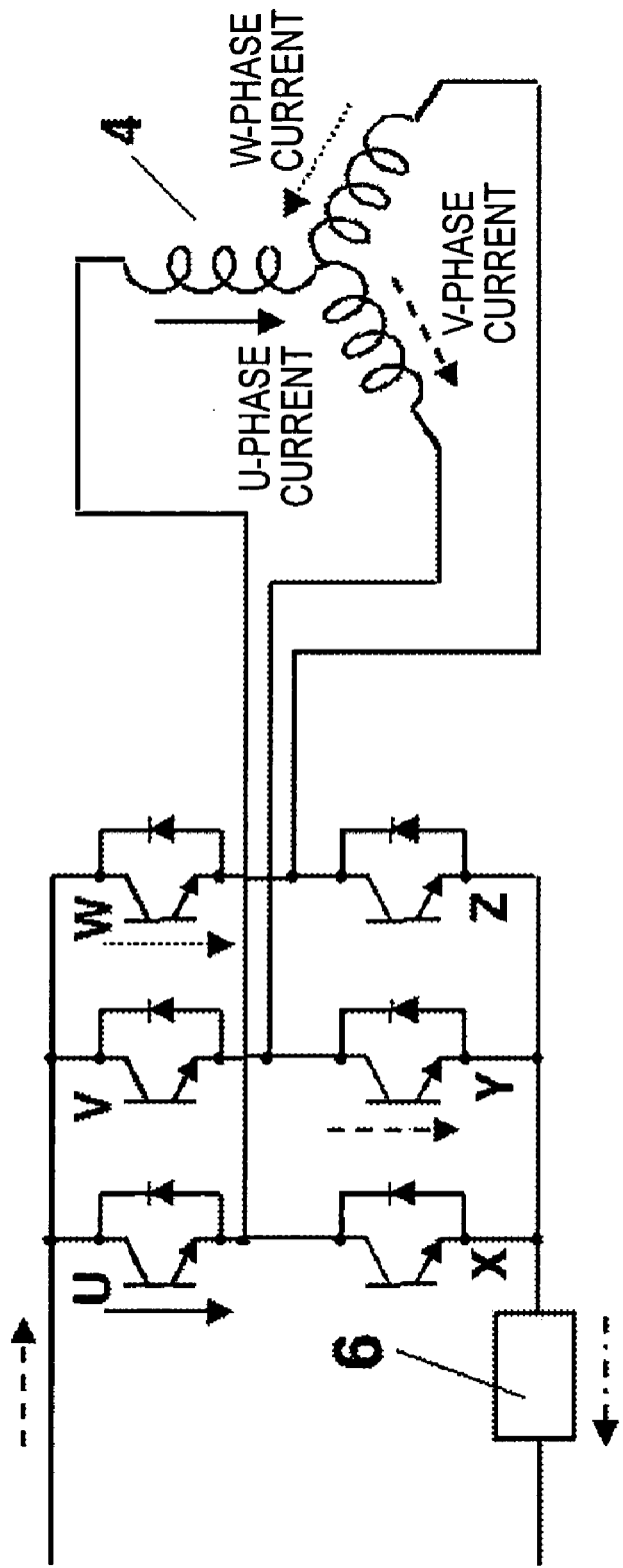
FIG. 11 is an electric circuit diagram showing a current route at a current feeding timing (c) of the above phase current detection.

In the current feeding pattern (c), the upper arm switching elements U, W are turned on, and the lower arm switching element Y is turned on. The current flow at this time is shown in FIG. 11.

As clear from the diagram, the U-phase current and W-phase current flow from the upper arm switching elements U and W to the stator windings 4, and the V-phase current flows from the stator winding 4 to the lower arm switching element Y. Hence, the V-phase current flows in the current sensor 6 and is detected.

Thus, since the U-phase current and V-phase current are detected, the remaining W-phase current is determined by applying the Kirchhoff current law at the neutral point of the stator windings 4.

In this case, the U-phase current is a current flowing into the neutral point of the stator windings 4, and the V-phase current is a current flowing out of the neutral point of the stator windings 4, and hence the W-phase current is determined by calculating the difference between the U-phase current and V-phase current.

Thus, the current can be detected in every carrier, and the position can be detected in every carrier, so that the output to the stator windings 4 can be adjusted. Accordingly, as compared with the 120-degree current feeding, torque fluctuations are made smaller, and a motor driving of a low noise and low vibration can be realized.

Especially in driving a motor mounted on a vehicle, a small size and light weight, a high vibration resistance reliability, low vibration and low noise are demanded, and such a control is preferable for controlling a drive of a motor-driven compressor and fan motors mounted on a vehicle.

In the embodiment 1, it is known that the phase current to be detected by the current sensor 6 is determined in the on/off state of the upper arm switching elements U, V, W. When only one phase is turned on, its phase current is detected, when two phases are turned on, the current of the remaining phase is detected, and when all three phases are turned on (or turned off, no current can be detected. Therefore, by checking which of the upper arm switching elements U, V, W in one carrier is turned on, the detectable phase current can be known.

Figure 12:
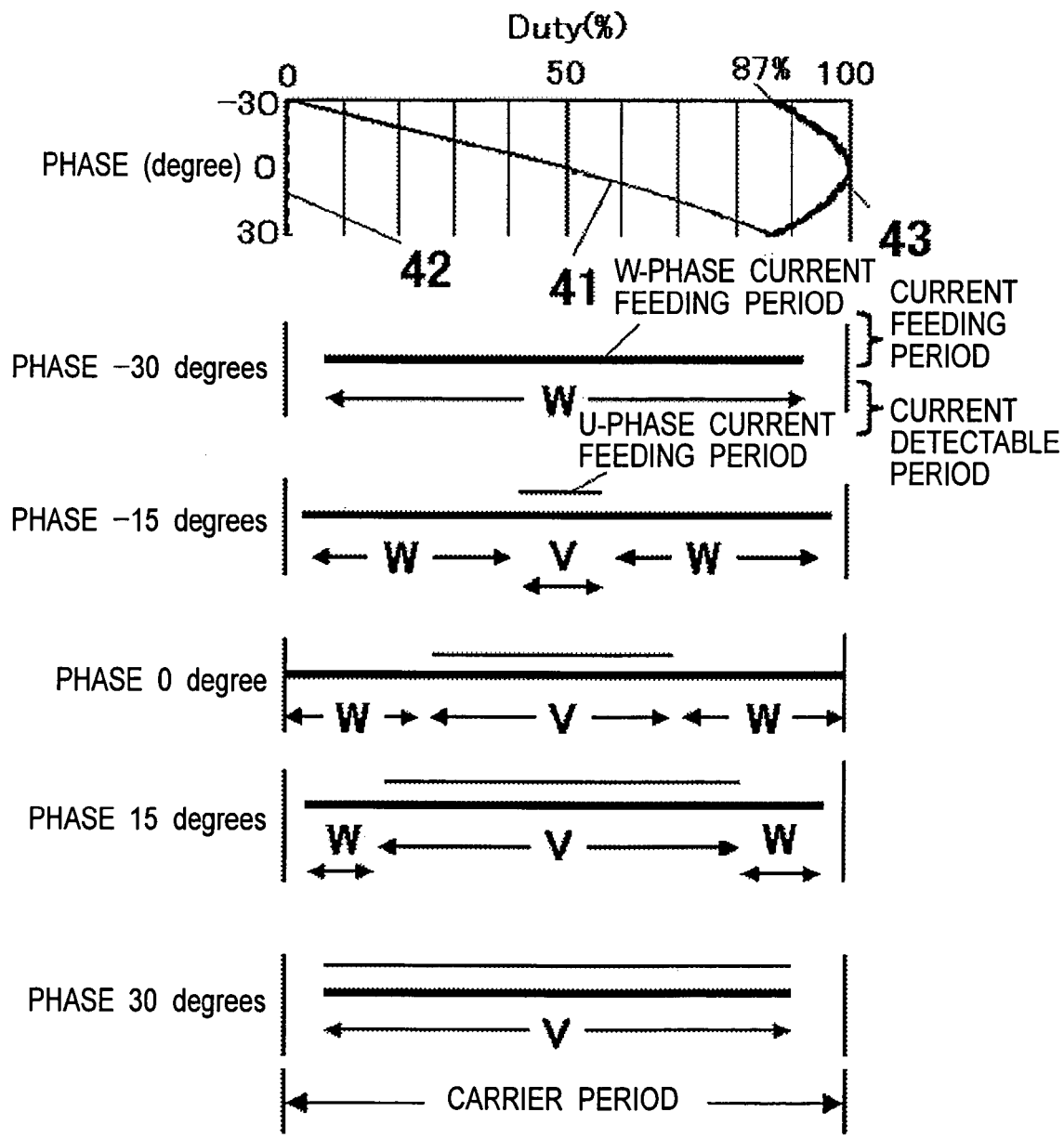
FIG. 12 is an explanatory diagram showing a phase current detection of two-phase modulation according to the first embodiment of the invention.

In FIG. 12, the current to be detected is examined according to this principle. In FIG. 12, the modulation degree in the phase range of −30 degrees to 30 degrees in the two-phase modulation at the maximum modulation 100% is shown horizontally on the top, and the ON period of the upper arm switching elements U, V, W within one carrier (carrier period) at each phase corresponding to the above modulation degree is shown below by distributing and displaying uniformly from the center.

In the diagram, reference numeral 41 is the U-phase terminal voltage, 42 is the V-phase terminal voltage, and 43 is the W-phase terminal voltage. In the lower part of the diagram, the current feeding period of the W phase is indicated by a thick solid line, and the current feeding period of U phase is indicated by a thin solid line. Arrows V and W shown beneath each current feeding period indicate the current detectable period of the V phase and current detectable period of the W phase, respectively.

More specifically, at a phase −30 degrees, from the upper terminal voltage diagram of each phase, the U-phase modulation degree is 0% and W-phase modulation degree is 87%, and the lower current feeding period diagram shows the modulation degree (current feeding time) of 87% of the W phase (thick lines) by distributing uniformly from the center supposing that one carrier (carrier period) is 100%. The same as above are shown in the other phases.

Herein, the phase range is −30 degree to 30 degrees because this pattern is repeated. The phase of the current to be detected is shown below the line. At the phase of −30 degrees and 30 degrees, it is known that the current of only one phase can be detected. In this case, the previously detected value may be used again or other measure may be needed, but there is a problem in the accuracy of detecting the position.

Figure 13:
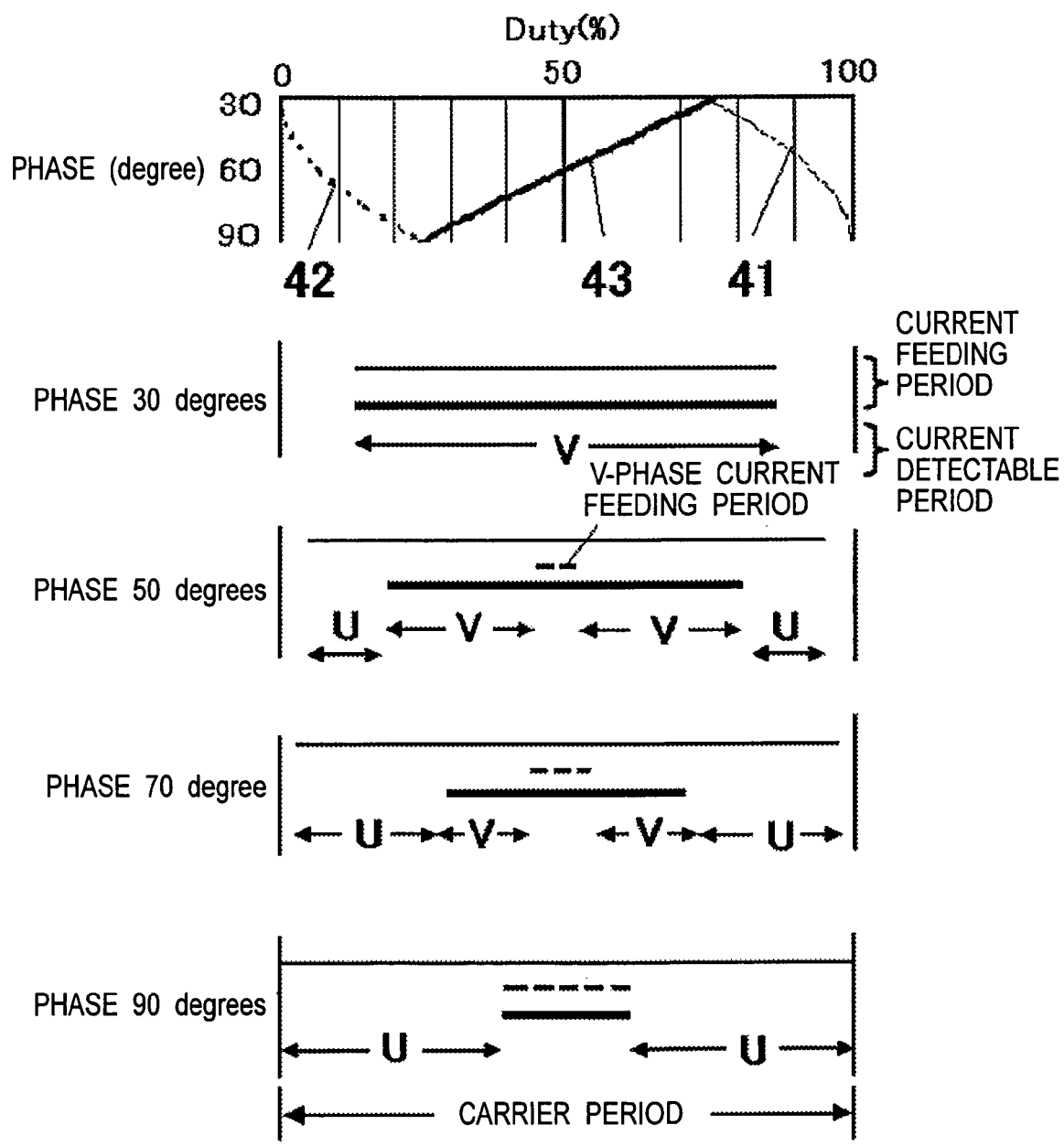
FIG. 13 is an explanatory diagram showing a phase current detection of three-phase modulation according to the first embodiment of the invention.

FIG. 13 shows a case in the phase range of 30 degrees to 90 degrees in the three-phase modulation at the maximum modulation 100%, in which it is the same at 30 degrees and 90 degrees. The range is from 30 degree to 90 degrees because this pattern is repeated. In the lower current feeding time period in FIG. 13, the V-phase current feeding period is indicated by a broken line, and an arrow marked U shows a U phase current detectable period.

EMBODIMENT 2

The embodiment 2 is explained with reference to FIG. 14 and FIG. 15. The embodiment 2 is intended to enhance the accuracy of detecting the position explained in FIG. 12 in the embodiment 1.

Figure 14:
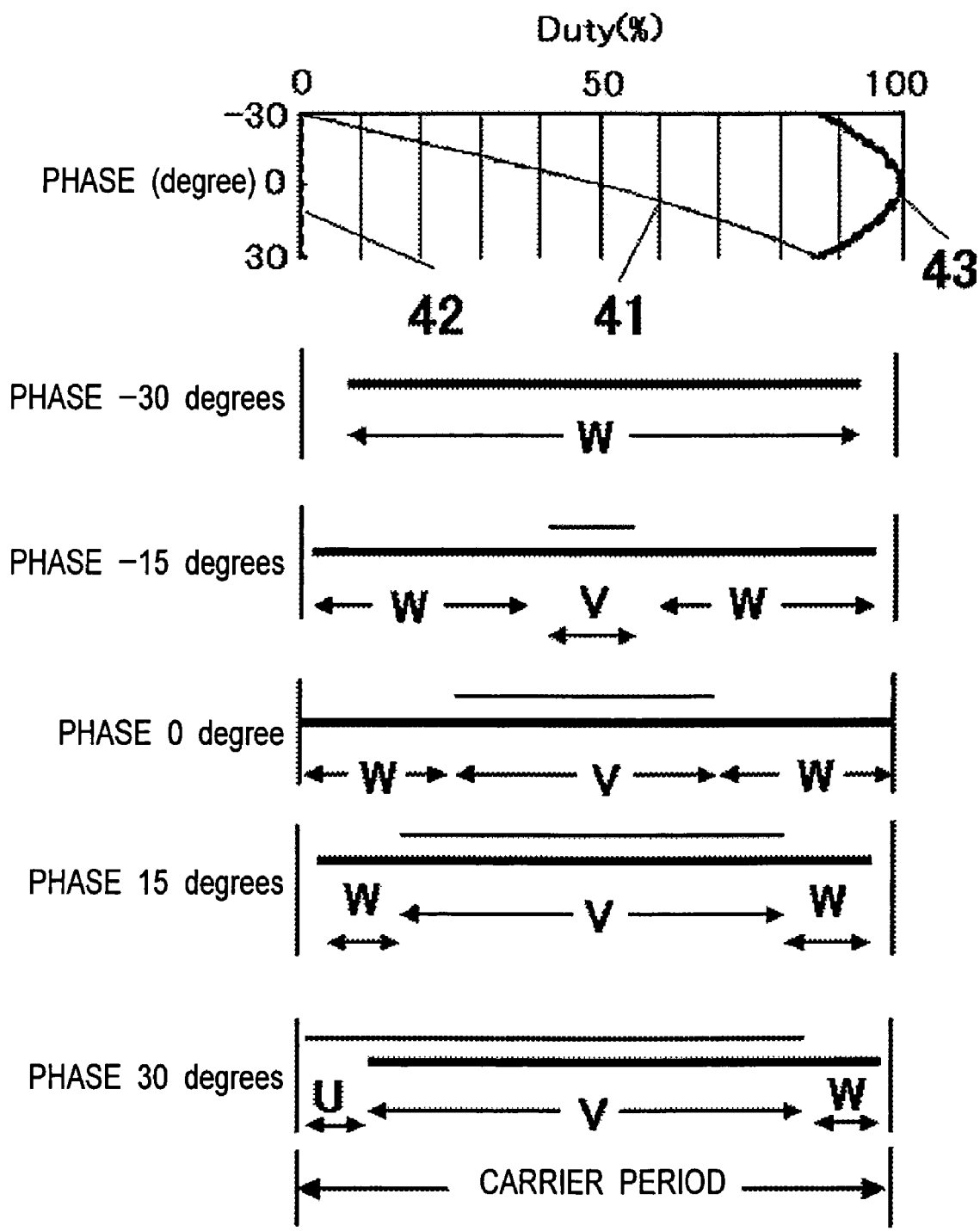
FIG. 14 is an explanatory diagram showing a phase current detection of two-phase modulation according to a second embodiment of the invention.

FIG. 14 shows the current feeding at the phase 30 degrees in FIG. 12, by shifting the U phase indicated by a thin solid line to the left side, and the W phase indicated by a thick solid line to the right side. As a result, not only the V phase, but also the current of U phase and current of W phase can be detected.

Figure 15:
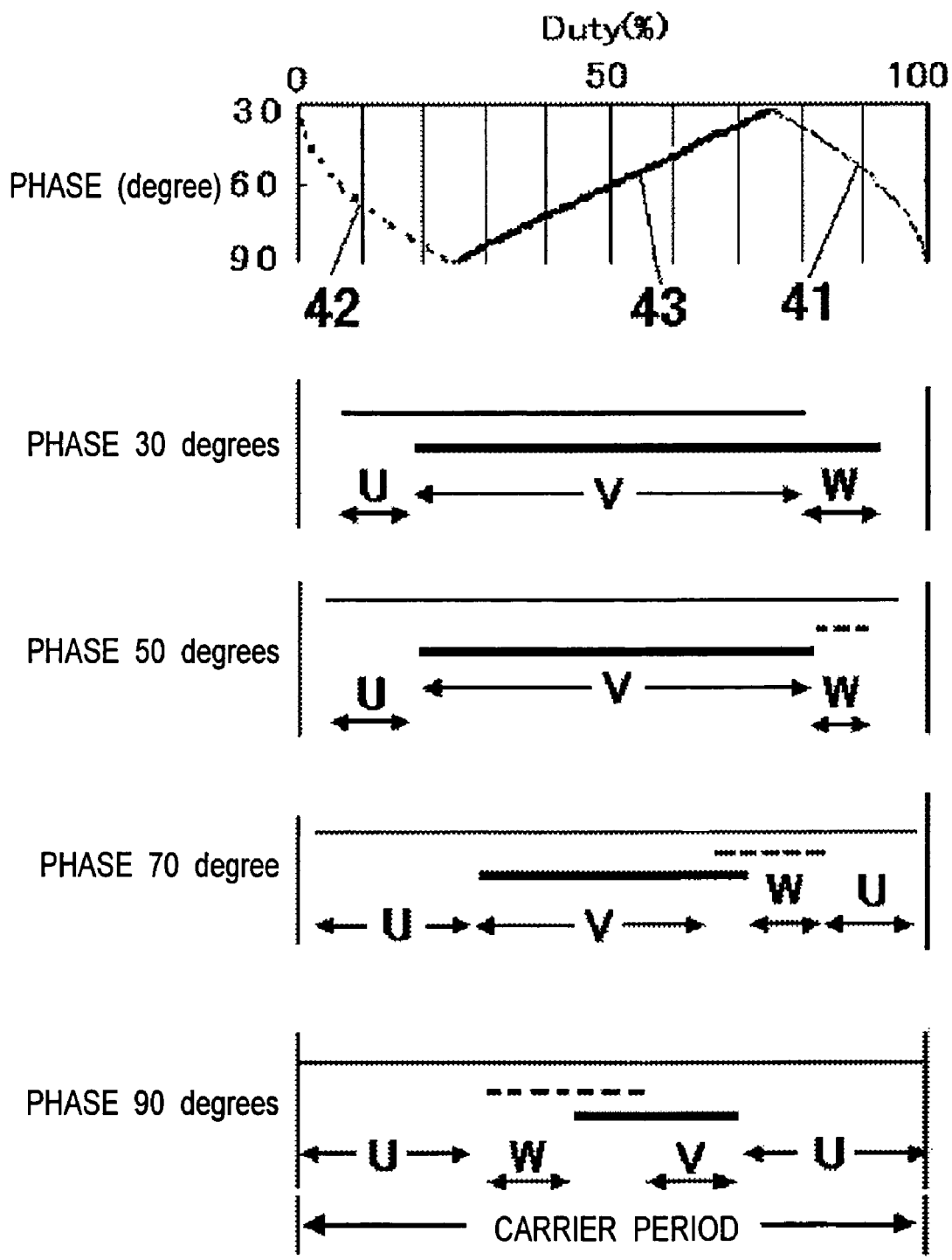
FIG. 15 is an explanatory diagram showing a phase current detection of three-phase modulation according to the second preferred embodiment of the invention.

FIG. 15 shows the current feeding at the phase 30 degrees, by shifting the U phase to the left side, and the W phase to the right side in FIG. 13. As a result, the current of U phase and current of W phase can be detected. Also, in the current feeding at the phase 90 degrees, the V phase is shifted to the left side and the W phase is shifted to the right side.

As a result, both currents of V phase and W phase can be detected. At phases of 50 degrees and 70 degrees, by shifting the V phase largely to the right side, the W phase can be also detected. Hence, in the three-phase modulation, all of the three phases U, V, and W can be detected by this method, and calculation of a current of the remaining phase after detecting two phases is not needed.

In the above explanation, the phases are specified, but it is evident that the same as above is obtained even if the phases are not specified.

According to this embodiment, the accuracy in detecting the position can be more improved.

EMBODIMENT 3

Figure 16:
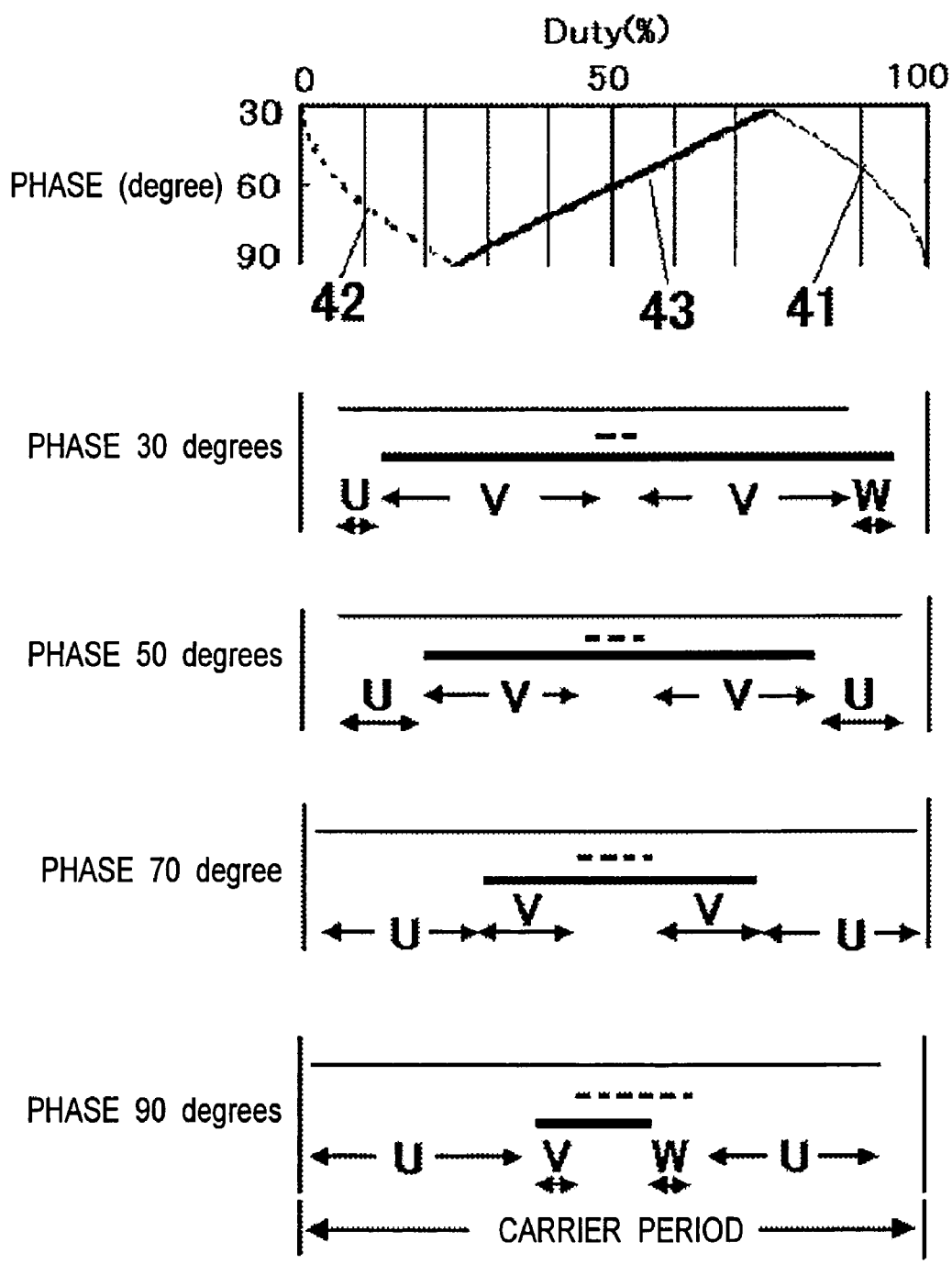
FIG. 16 is an explanatory diagram showing a phase current detection of three-phase modulation according to a third embodiment of the invention.

The embodiment 3 is explained with reference to FIG. 16. The present embodiment in FIG. 16 shows another method of enhancing the accuracy in detecting the position explained in FIG. 12 in the embodiment 1.

First, an effect of a three-phase modulation is described.

For reducing vibrations, it is preferred to use a three-phase modulation. In the three-phase modulation, the modulation range relative to the phase range is narrower compared to the case of the two-phase modulation, and a sinusoidal current is smoothed and a vibration becomes smaller.

In FIG. 8, in the case of the three-phase modulation, the ON period is added also to the V phase. As a result, in the center of the carrier period, all three phases of U, V, and W are turned on. When the three phases are turned on, no current flows in the current sensor 6, and it is the same when all three phases are turned off (power is not supplied to the motor from the power source in either case). Hence, the carrier period is divided into a former half and latter half, and electric power is supplied (modulated). In other words, as compared with the two-phase modulation, it is equivalent that the carrier period is half and the carrier frequency is double.

Therefore, a fine and smooth sinusoidal current is supplied to the motor. Hence, in the three-phase modulation, as compared with the two-phase modulation, the noise and vibration can be further reduced.

In FIG. 6, for example, when 20% is added to each phase, the neutral point voltage (the sum of terminal voltages of phases being divided by 3) is increased by 20%. Since the phase voltage is the difference value of subtracting the neutral point voltage from the terminal voltage, the increment of 20% is canceled, and the phase voltage is the same as that before addition. It is the same in the case of a minus operation.

Hence, in the three-phase modulation, the phase voltage remains the same even if the same phase value is plus or minus in current feeding, and by making use of this nature, and in FIG. 16, the current feeding at the phase of 30 degrees in FIG. 13 is added to the left side in the U phase and to the right side in the W phase. Equally to this plus portion, the current feeding in the V phase is added. As a result, the current of U phase and current of W phase can be also detected.

Also, by making use of this nature of the three-phase modulation that the phase voltage remains the same even if the same phase value is plus or minus in current feeding, the current feeding at the phase of 90 degrees is subtracted to the left side in the V phase and to the right side in the W phase. Equally to this minus portion, the current feeding in the U phase is subtracted at the right side. As a result, the current of V phase and current of W phase can be also detected.

In the above explanation, the phases are specified, but it is evident that the same as above can be obtained even if the phases are not specified. According to this embodiment, the position can be detected more accurately in the three-phase modulation.

EMBODIMENT 4

Figure 17:
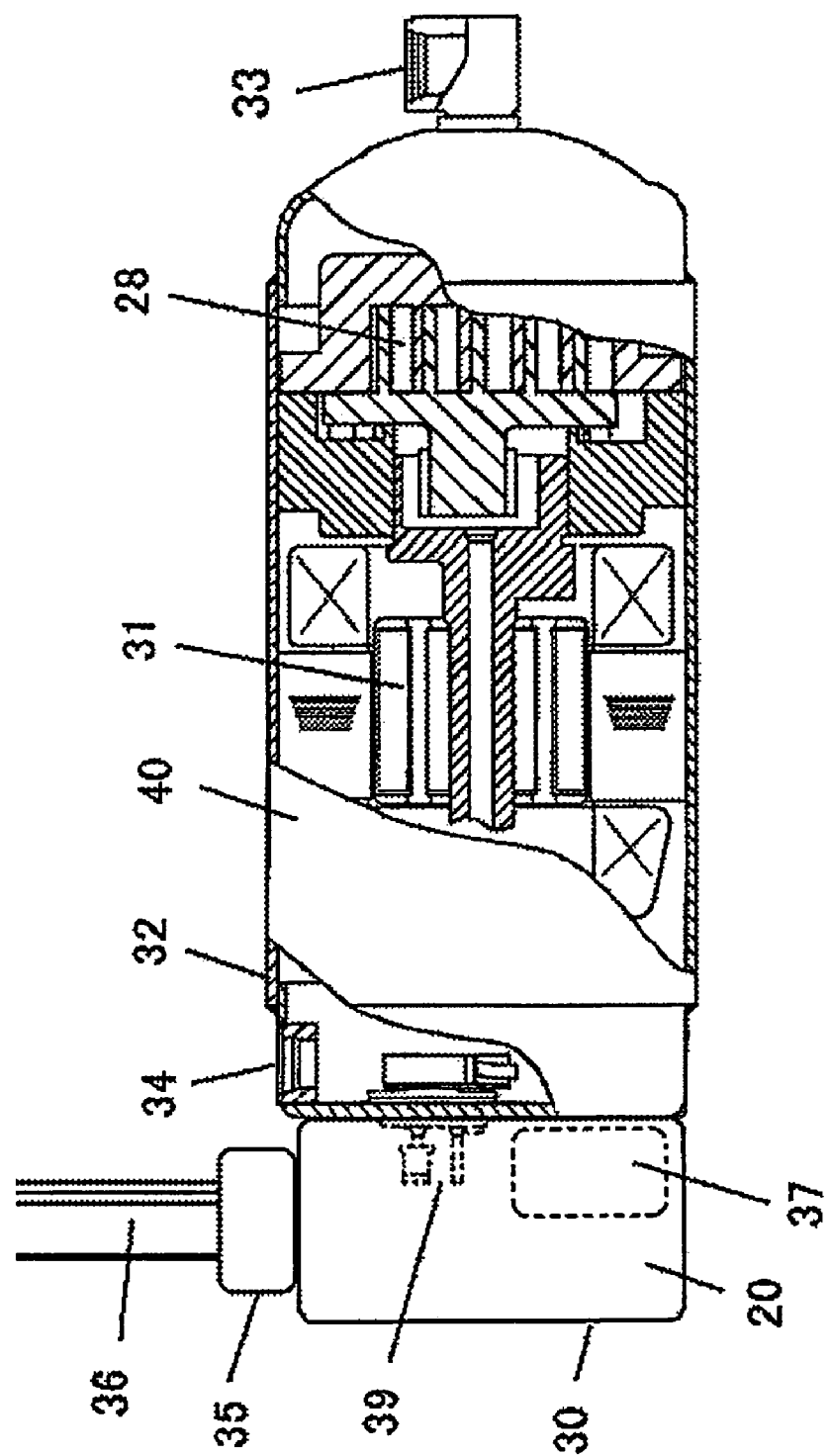
FIG. 17 is a sectional view of a motor-driven compressor of an inverter device integrated type according to a fourth embodiment of the invention.

FIG. 17 shows a coupled assembly of a motor-driven compressor with an inverter device coupled thereto according to the present embodiment 4. In FIG. 17, an inverter device 20 is installed closely contacting to the left side of a motor-driven compressor 40, and a compression mechanism 28, a motor 31 and others are installed in a metal casing 32. In the following explanation, it is noted that the coupled assembly is also called as "an inverter device integrated motor-driven compressor."

A refrigerant is sucked in through a suction port 33, and is compressed as the compression mechanism 28 (a scroll in this example) is driven by the motor 31.

The compressed refrigerant cools the motor 31 when passing through the motor 31, and is discharged from a discharge port 34. A terminal 39 connected to the windings of the motor 31 inside is connected to the inverter device 20.

The inverter device 20 has a case 30 so as to be coupled to the motor-driven compressor 40. An inverter circuit 37 acting as a heat source releases heat to a metal casing 32 of the motor-driven compressor 40 by way of the case 30. That is, the inverter circuit 37 is cooled by the refrigerant in the motor-driven compressor 40 by way of the metal casing 32.

The terminal 39 is connected to an output of the inverter circuit 37. Connection wires 36 consist of power supply wires to the battery 1 and control signal wires to the air conditioner controller. By using the windings of the motor 31 of a concentrated winding, the length in the lateral direction can be made shorter as compared with that of a distributed winding. Since the inductance of the concentrated winding is large, a reflux time to a diode is prolonged and the position detection is difficult and therefore a control is difficult, but in a sinusoidal driving, the position is detected by the current so that it is possible to perform a control.

In such an inverter device integrated type motor-driven compressor, it is important that the inverter device 20 should be small in size and has a strong vibration-proof, and it is preferable as the embodiment of the present invention.

Figure 18:
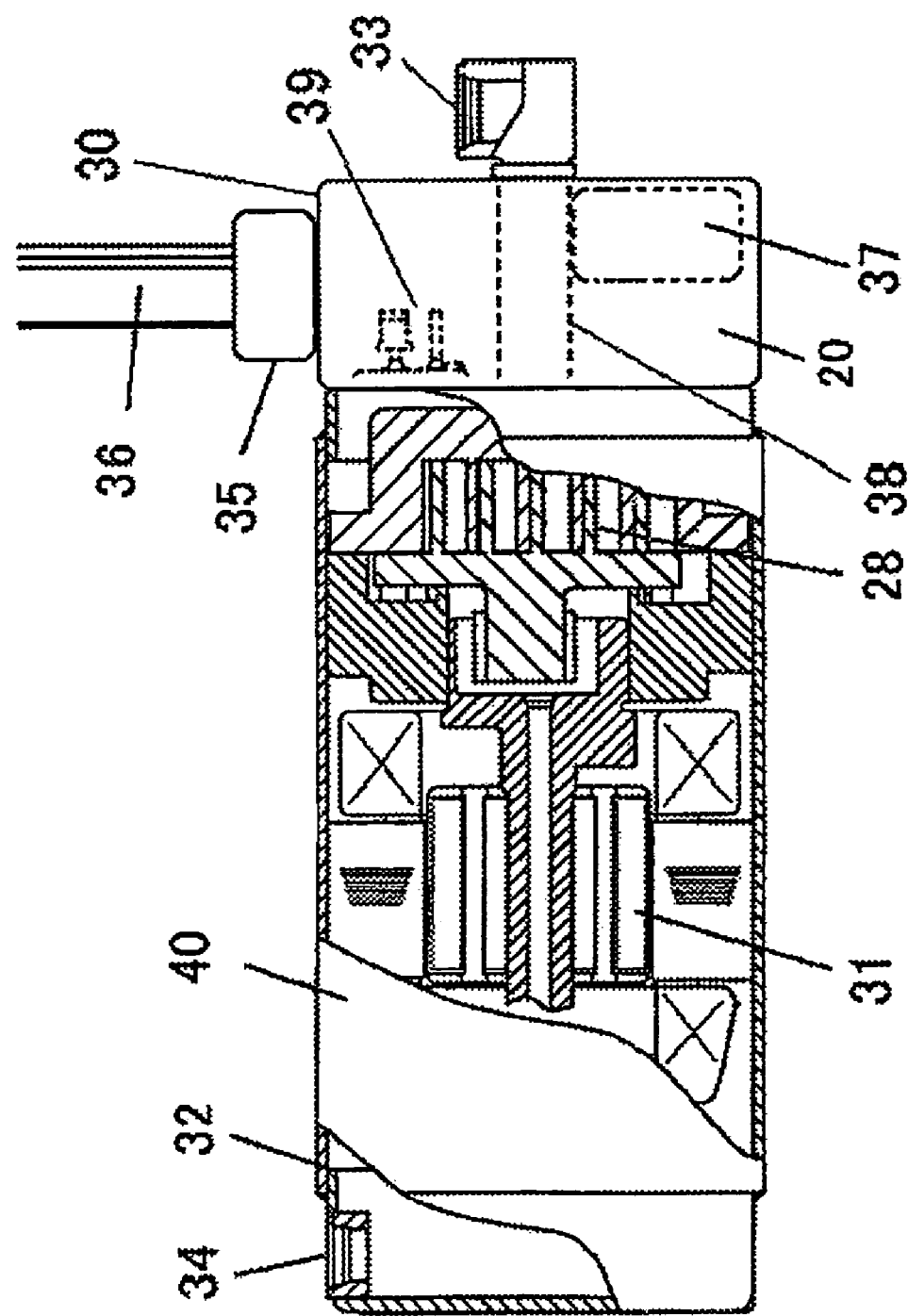
FIG. 18 is a sectional view of a motor-driven compressor of an inverter device integrated type of another example of the invention.

FIG. 18 shows an example of the inverter device 20 which is installed at the right side of the motor-driven compressor 40. The inverter circuit 37 is cooled by a suction pipe 38. In order not to condense dew by this cooling, the inverter device 20 is installed beneath the suction pipe 38, so that the surrounding temperature of the inverter device 20 is also lowered to decrease a temperature difference.

Figure 19:
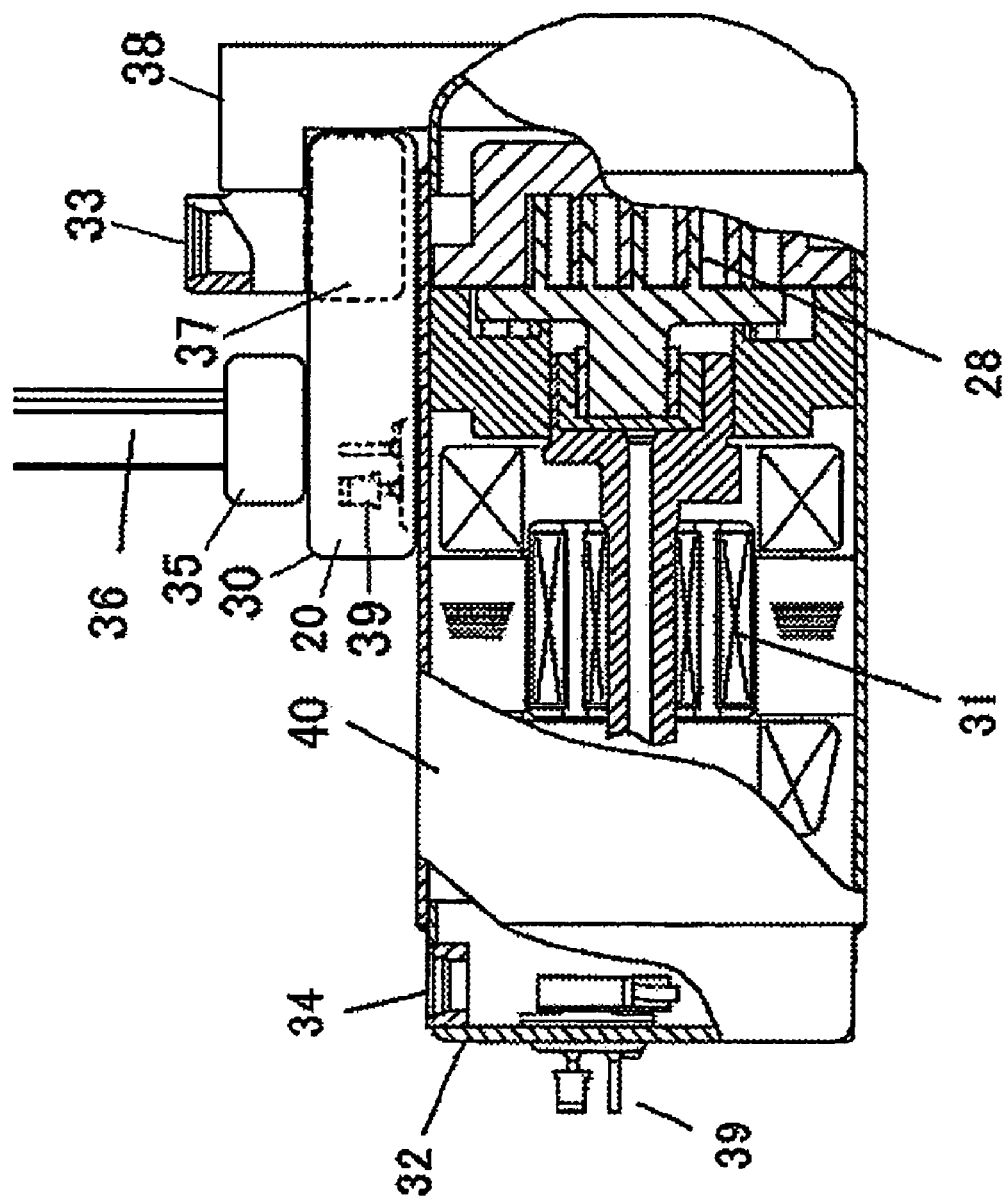
FIG. 19 is a sectional view of a motor-driven compressor of an inverter device integrated type of still another example of the invention.
Figure 20:
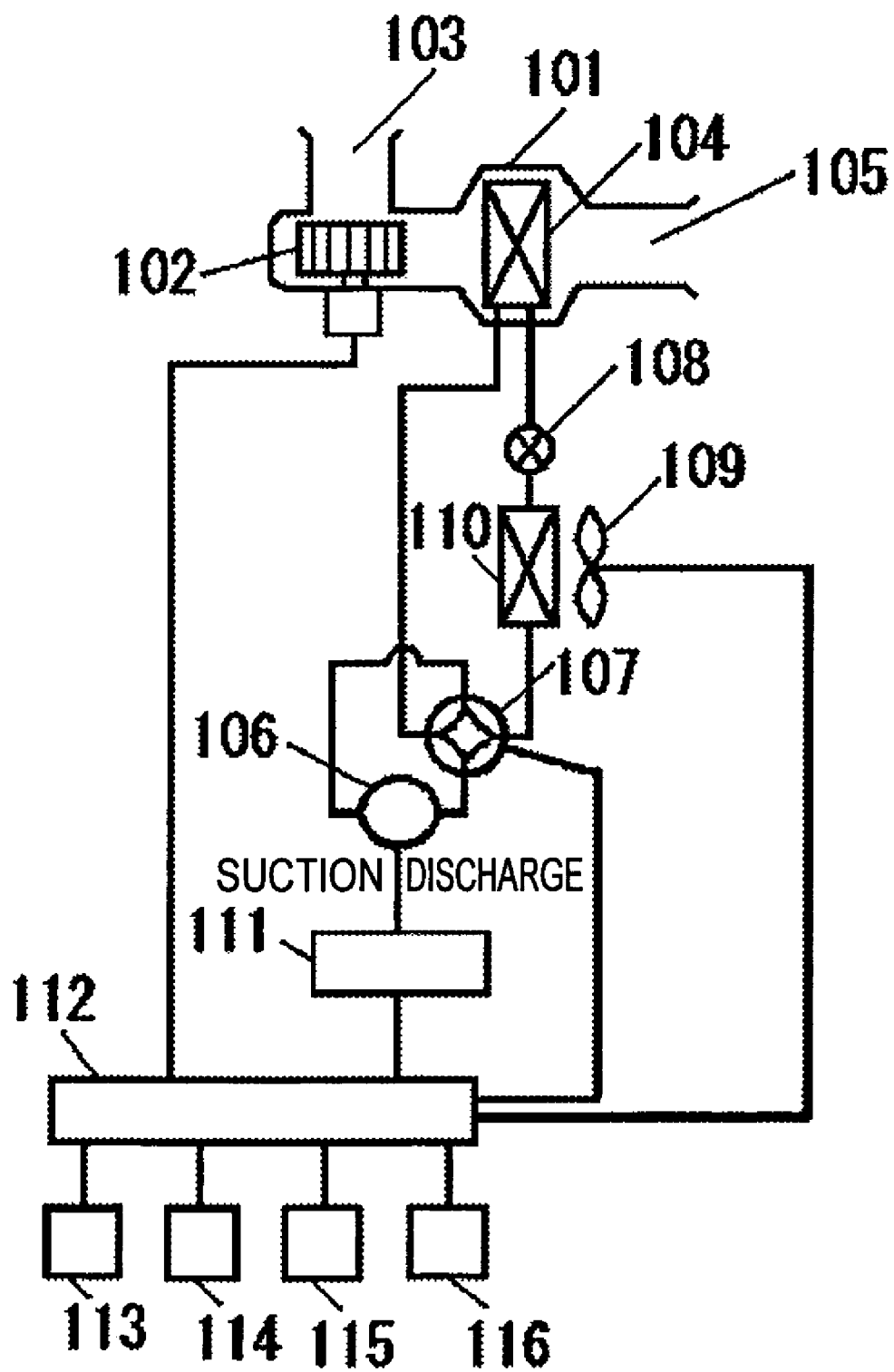
FIG. 20 is a system configuration diagram of an air conditioner for a vehicle mounting a conventional motor-driven compressor.
Figure 21:
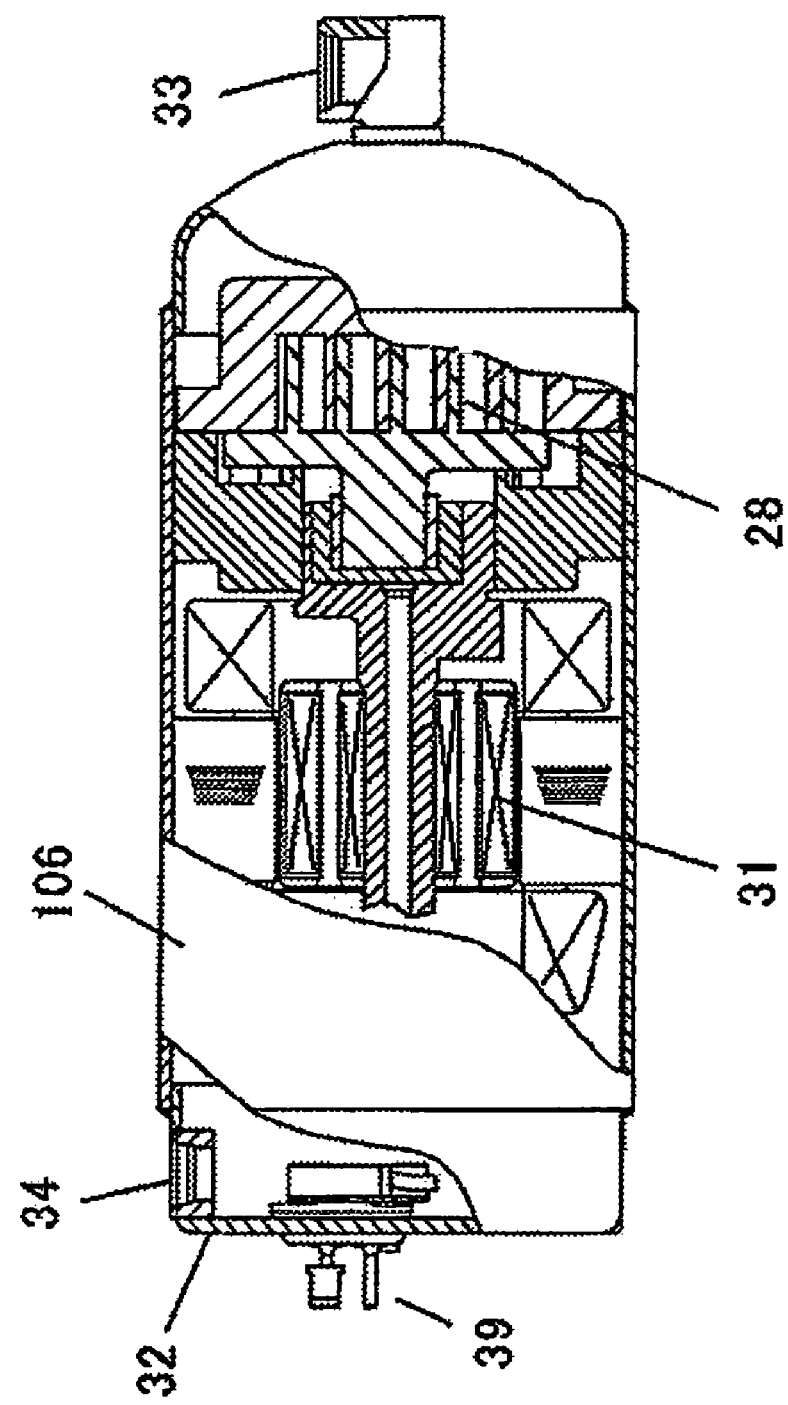
FIG. 21 is a partially cut-away sectional view of a conventional motor-driven compressor.

FIG. 19 shows an example of the inverter device 20 which is installed between the motor-driven compressor 40 and the suction pipe 38. In this case, the inverter circuit 37 is cooled by the suction pipe 38.

These two examples shown in FIG. 18 and FIG. 19 have the following merits.

That is, since the suction pipe 38 is not heated by the compressor 40, the efficiency of the compressor 40 is not lowered. The inverter device 20 hardly condenses dew. Cool air from the suction pipe 38 flows down by convection in the case 30, and the inside of the case 30 can be cooled efficiently. Besides, since the cool air flows down, the current sensor 6 and controller 7 are also cooled (see FIG. 1) besides the inverter circuit 37, and the reliability of the inverter device 20 is assured.

The piping may be formed in any shape as desired such as flat. An insulating material or insulating space may be provided between the inverter circuit 37 or inverter device 20 and the compressor 40.

The motor 31 is preferably a sensorless DC brushless motor favorable for performing a control in the embodiments 1 to 3. That is, the inverter device comprises an inverter circuit for switching the direct-current voltage from the direct-current power source by three-phase modulation, and supplying a sinusoidal alternating current to the sensorless DC brushless motor having stator windings connected by three-phase wirings and permanent magnet rotor, and one current detecting means for detecting a current flowing through each of the stator windings of the sensorless DC brushless motor, and the inverter device judges the position of the permanent magnet rotor by the current value detected by the current detecting means so as to control the switching of the inverter circuit, whereby the current feeding timing to each phase of the stator windings of the sensorless DC brushless motor is shifted in the carrier period to detect the current flowing in the stator winding by the current detecting means, so that the position of the permanent magnet rotor is judged.

INDUSTRIAL APPLICABILITY

In the foregoing embodiments, the direct-current power source is a battery, but not limited to this, and the invention may be also applied to the inverter device using a direct-current power source by rectifying commercial alternating-current power source, and driving an industrial motor, or an inverter device (for such as a room air conditioner) for driving a motor for electric household appliance, and others.

What is claimed is:

1. An inverter device for driving a sensorless DC brushless motor, comprising:
   an inverter circuit for switching a direct-current voltage obtained from a direct-current power source and supplying an alternating-current current of a sinusoidal wave to the sensorless DC brushless motor, wherein the direct-current voltage of the direct-current power source is switched by three-phase modulation; and
   current detecting means for detecting a power supply current between the direct-current power source and the inverter circuit,
   wherein the sensorless DC brushless motor includes stator windings of a three-phase wiring (U, V, W) electrically connected to the inverter circuit and a magnet rotor, and
   within a carrier period of the three-phase modulation, a current feeding time is equally added or subtracted in a current feeding period in each phase of the stator windings, and
   the current detecting means is a single current detecting means which is used also for detecting the current flowing in the stator windings, and by detecting the current flowing in the stator windings as well as detecting the power supply current, a rotational position of the magnet rotor is judged to thereby control the switching of the inverter circuit.

2. The inverter device according to claim 1, which is adapted to be mounted on a vehicle.

3. The inverter device according to claim 1, driving the sensorless DC brushless motor which is a driving source of the compressor.

4. The inverter device according to claim 1, wherein the current detecting means is a current sensor, said current sensor detecting a current flowing in one of the three phases of the stator windings when the direct-current voltage of the direct-current power source is switched on for the one of the three phases of the modulation.

5. The inverter device according to claim 1, wherein the current detecting means is a current sensor, said current sensor detecting a current flowing in one of the three phases of the stator windings when the direct-current voltage of the direct-current power source is switched on for the other two of the three phases of the modulation.

6. An air conditioner comprising a compressor, a sensorless DC brushless motor acting as a driving source of the compressor, and an inverter device adapted for driving the brushless motor, wherein the inverter device comprises:

an inverter circuit for switching a direct-current voltage obtained from a direct-current power source and supplying an alternating-current current of a sinusoidal wave to the sensorless DC brushless motor; and current detecting means for detecting a power supply current between the direct-current power source and the inverter circuit, wherein the sensorless DC brushless motor includes stator windings of a three-phase wiring (U, V, W) electrically connected to the inverter circuit and a magnet rotor, and the current detecting means is a single current detecting means which is used also for detecting the current flowing in the stator windings, and by detecting the current flowing in the stator windings as well as detecting the power supply current, a rotational position of the magnet rotor is judged to thereby control the switching of the inverter circuit, wherein the inverter device switches the direct-current voltage from the direct-current power source by three-phase modulation and, within a carrier period of the three-phase modulation, equally adds or subtracts a current feeding time in a current feeding period in each phase of the stator windings.

7. The air conditioner according to claim 6, wherein the inverter device is adapted to be mounted on a vehicle.

8. The air conditioner according to claim 6, wherein the inverter device is integrally coupled to the compressor together with the sensorless DC brushless motor.

9. The air conditioner according to claim 8 comprising a suction pipe, which is adapted to the compressor, for sucking a refrigerant for cooling the inverter device.

10. The air conditioner according to claim 9, wherein the inverter device is disposed beneath the suction pipe.

11. The air conditioner according to claim 10, wherein the inverter device is disposed between the suction pipe and the compressor.

12. The air conditioner according to claim 9, wherein the inverter device is disposed between the suction pipe and the compressor.

* * * * *

UNITED STATES PATENT AND TRADEMARK OFFICE
CERTIFICATE OF CORRECTION

PATENT NO. : 7,574,873 B2  Page 1 of 1
APPLICATION NO. : 10/537982
DATED : August 18, 2009
INVENTOR(S) : Naomi Goto et al.

It is certified that error appears in the above-identified patent and that said Letters Patent is hereby corrected as shown below:

In the Background of the Invention, at Column 8, lines 19, 30 and 40 "element Y Hence" should read --element Y. Hence--, at Column 9, line 2, "(or turned off" should read --(or turned off)--

Signed and Sealed this

Thirtieth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,574,873 B2  Page 1 of 1
APPLICATION NO. : 10/537982
DATED : August 18, 2009
INVENTOR(S) : Goto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 953 days.

Signed and Sealed this

Seventh Day of September, 2010

David J. Kappos
*Director of the United States Patent and Trademark Office*